(12) United States Patent
Quan et al.

(10) Patent No.: US 11,762,115 B2
(45) Date of Patent: Sep. 19, 2023

(54) FRACTURE WAVE DEPTH, BOREHOLE BOTTOM CONDITION, AND CONDUCTIVITY ESTIMATION METHOD

(71) Applicant: Seismos, Inc., Austin, TX (US)

(72) Inventors: Youli Quan, Houston, TX (US); Junwei Zhang, Austin, TX (US); Jakub Felkl, Bedford, NH (US); Jeremy Dumoit, Richmond, TX (US)

(73) Assignee: Seismos Inc., Austin, TX (US)

( * ) Notice: Subject to any disclaimer, the term of this patent is extended or adjusted under 35 U.S.C. 154(b) by 0 days.

(21) Appl. No.: 17/730,698

(22) Filed: Apr. 27, 2022

(65) Prior Publication Data

US 2022/0252749 A1    Aug. 11, 2022

Related U.S. Application Data

(60) Division of application No. 16/441,052, filed on Jun. 14, 2019, now Pat. No. 11,340,367, which is a continuation of application No. PCT/US2018/046147, filed on Aug. 9, 2018.

(60) Provisional application No. 62/543,256, filed on Aug. 9, 2017.

(51) Int. Cl.
| G01V 1/00 | (2006.01) |
| G01V 1/30 | (2006.01) |
| G01V 1/50 | (2006.01) |
| E21B 47/095 | (2012.01) |

(52) U.S. Cl.
CPC ............ *G01V 1/301* (2013.01); *E21B 47/095* (2020.05); *G01V 1/306* (2013.01); *G01V 1/50* (2013.01); *G01V 1/303* (2013.01); *G01V 2210/121* (2013.01); *G01V 2210/1299* (2013.01); *G01V 2210/1425* (2013.01); *G01V 2210/1429* (2013.01); *G01V 2210/41* (2013.01); *G01V 2210/43* (2013.01); *G01V 2210/6222* (2013.01); *G01V 2210/646* (2013.01)

(58) Field of Classification Search
USPC .......................................................... 367/35
See application file for complete search history.

(56) References Cited

U.S. PATENT DOCUMENTS

| 6,135,234 A | 10/2000 | Harrus et al. |
| 7,602,669 B2 | 10/2009 | Korneev et al. |
| 8,706,419 B1 | 4/2014 | Frazier |
| 9,140,815 B2 | 9/2015 | Lopez et al. |
| 9,658,357 B2 | 5/2017 | Kabannik et al. |
| 11,340,367 B2 * | 5/2022 | Quan .................... E21B 47/095 |

(Continued)

OTHER PUBLICATIONS

International Search Report and Written Opinion, International Application No. PCT/US2018/046147 dated Jan. 7, 2019.

*Primary Examiner* — James R Hulka
(74) *Attorney, Agent, or Firm* — Richard A. Fagin

(57) ABSTRACT

A method for characterizing a hydraulic fracture in a subsurface formation includes inducing a pressure change in a borehole drilled through the subsurface formation. At least one of pressure and a time derivative of pressure is measured in the borehole for a selected length of time. At least one physical parameter of at least one fracture is determined using the measured pressure and/or the time derivative of pressure. A method for characterizing hydraulic fracturing rate uses microseismic event count measured through the borehole and its real-time implementation.

12 Claims, 34 Drawing Sheets

(56) References Cited

U.S. PATENT DOCUMENTS

| | | |
|---|---|---|
| 2008/0175100 A1 | 7/2008 | Korneev et al. |
| 2013/0079935 A1 | 3/2013 | Kabannik et al. |
| 2013/0100768 A1 | 4/2013 | Lopez et al. |
| 2017/0075004 A1 | 3/2017 | McColpin et al. |
| 2019/0310386 A1* | 10/2019 | Quan ............... G01V 1/301 |

* cited by examiner

FRACTURE WAVE DEPTH, BOREHOLE BOTTOM CONDITION, AND CONDUCTIVITY ESTIMATION METHOD

CROSS REFERENCE TO RELATED APPLICATIONS

Divisional of U.S. application Ser. No. 16/441,052 filed on Jun. 14, 2019, which is a continuation of International Application No. PCT/US2018/046147 filed on Aug. 9, 2018. Priority is claimed from U.S. Provisional Application No. 62/543,256 filed on Aug. 9, 2017. All the foregoing applications are incorporated herein by reference in their entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of seismic analysis and hydraulic fracture as well as hydraulic fracturing process monitoring and evaluation. In particular, the monitoring can be in real time, considering the borehole and fracture condition. While hydraulic stimulation takes place; additional analysis of the data can also be performed at a later time.

This disclosure also relates to the field of seismic analysis of hydraulic fractures and hydraulic fracturing treatment. More specifically, the disclosure relates to method for analyzing geophysical properties of hydraulic fracture, fracture fluids or fracture properties over time by analysis of pressure waves and their resonances. In addition, the disclosed method includes resonance frequency mapping to identify events and changes in the borehole during stimulation.

Furthermore, this disclosure also relates to measurements of fracture (network) connectivity to borehole and fracture (network) connectivity to the external reservoir volume, perforation cluster "efficiency", gel breakdown time, leak off rates, and fracture conductivity over time. The conductivity measurements can be related to future or expected production from a stimulated borehole on a per-stage basis.

SUMMARY

A method for characterizing fractures in a subsurface formation, according to one aspect of the present disclosure comprises imparting seismic energy into a liquid filled borehole drilled through the subsurface formation. Seismic energy is detected in the borehole. The detected seismic energy is used to characterize at least one fracture in the subsurface formation. The characterizing comprises estimating a tube wave velocity in a borehole intermediate casing and a tube wave velocity in a borehole production casing from the detected seismic energy. A fracture depth is estimated using a difference between the estimated tube wave velocity in the borehole intermediate casing and the estimated tube wave velocity in the borehole production casing.

Some embodiments further comprise comparing wave propagation speeds in different portions of the borehole.

In some embodiments, the different portions of the borehole are determined by determining existence in the detected seismic energy of measurable reflections from at least one of borehole structural components, borehole fluid differences, and interfaces.

In some embodiments, wherein the structural components comprise at least one change in borehole casing properties at a known depth in the borehole.

In some embodiments, the borehole fluid differences comprise at least one of change in density, viscosity, or type of fluid.

In some embodiments, the characterizing comprises determining at least one of travel time, phase, amplitude, and existence of expected versus actual reflection events in the detected seismic energy.

Some embodiments further comprise repeating the imparting seismic energy, detecting seismic energy and determining at least one of travel time, phase, amplitude, and existence of expected versus actual reflection events in the detected seismic energy and determining fracture conductivity by inverting the determined and repeated determined at least one of travel time, phase, amplitude, and existence of expected versus actual reflection events.

A method for characterizing subsurface borehole and near-borehole conditions according to another aspect of the present disclosure includes imparting seismic energy into a liquid filled borehole drilled through the subsurface formation, detecting seismic energy in the borehole; and using the detected seismic energy to characterize the borehole and near-wellbore conditions. The characterizing includes estimating a tube wave velocity in a borehole intermediate casing and a tube wave velocity in a borehole production casing from the detected seismic energy and estimating a fracture conductivity.

Some embodiments further comprise evaluating a borehole bottom condition by determining a polarity of tube wave reflections from borehole components disposed at selected positions along an interior of the borehole.

In some embodiments, the bottom of the borehole corresponds to at least one of a plug, a packer, and a barrier in the borehole.

Some embodiments further comprise comparing a borehole bottom condition made for at least two fracture treatment stages.

A method for characterizing fractures in a subsurface formation according to another aspect of the present disclosure includes measuring pressure in a borehole drilled through the subsurface formation during and immediately after pumping hydraulic fracturing fluid into the subsurface formation, determining a rate of decay of the measured pressure after the pumping hydraulic fracturing fluid and determining an effective conductivity of at least one fracture from the determined rate of decay.

In some embodiments, the determined rate of decay comprises exponential decay and linear decay to account for fracture diffusion phenomena combined with fluid storage in the borehole.

In some embodiments, a measure of fluid pressure leak-off rate after fracturing treatment is determined by interpolating a rate of decline of measured pressure in the borehole after an end of pumping a fracture treatment.

In some embodiments, changes in acoustic velocity within the borehole portions are used as a proxy for at least one of fracture conductivity and changes in lower borehole condition by comparing v1 (upper) and v2 (lower)

A method for characterizing fractures in a subsurface formation according to another aspect of the present disclosure includes imparting seismic energy into a liquid filled borehole drilled through the subsurface formation, detecting seismic energy in the borehole comprising energy reflected from the subsurface formation through wellbore tube-waves, estimating a tube wave velocity, phase, frequency content, and amplitude of at least one reflected energy waveform to match a model, and using inversion to match the detected energy and the model to converge at a fracture conductivity product kw to characterize at least one fracture in the subsurface formation.

Some embodiments further comprise repeating the imparting, detecting, estimating and using inversion to determine fracture conductivity of the subsurface formation over time.

In some embodiments, the seismic energy is induced by at least one of shut-in water hammer, pumping a treatment fluid, pumping a wireline, setting a bridge plug in the borehole, and perforating the borehole.

Some embodiments further comprise determining conductivity of a fractured formation at various distances from the borehole by inverting for a predefined frequency of a seismic energy source.

Some embodiments further comprise determining a measure of fracturing treatment quality of a borehole and a fracture treatment stage having at least two fractured sections by comparing determined fracture conductivities between the at least two fracture stages.

In some embodiments, at least one of a state of perforations of a borehole casing, a state of a borehole plug, and a state of a most recently pumped fracture treatment stage is determined by comparison with at least one of the state of the perforations, the state of the plug and the state of the most recently pumped fracture treatment stage is with at least one of the state of the perforations, the state of the plug and the state of at least one other fracture treatment stage in the same borehole or another borehole.

In some embodiments, fracture closure stresses are determined from the determined fracture conductivity at once and with respect to time.

In some embodiments, fracture closure pressures are determined from the determined fracture conductivity at once and with respect to time.

In some embodiments, viscosity change over time is determined by determining an increase or a decrease in determined fracture conductivity with respect to time.

In some embodiments, at least one of chemical breakdown and chemical reaction time is determined based on a change in calculated fracture conductivity.

In some embodiments, a gel breakdown profile with respect to time is determined.

In some embodiments, borehole fluids include gel or sand-laden fluids

A method for characterizing fractures and hydraulic fracturing treatment in a subsurface formation according to another aspect of the present disclosure includes pumping a hydraulic fracturing treatment into the subsurface formation, measuring at least one of pressure and the derivative of pressure while fracturing treatment is ongoing, detecting and analyzing seismic energy induced in the borehole, in a form of a frequency spectrum of energy reflected from the subsurface region by borehole tube-waves, and using detected resonances and change thereof over time to characterize at least one of the borehole condition, a property of the fracturing treatment, at least one fracture in the subsurface formation and a fracture network.

In some embodiments, a fracture extent and growth thereof are determined by analyzing acoustic energy frequency spectra.

In some embodiments, abrupt changes in at least one dominant frequency is flagged for a potential operational difficulty.

In some embodiments, fracture treatment proppant placement and/or fracture proppant conductivity distribution is determined by analyzing acoustic energy frequency spectra with respect to proppant penetration depths.

In some embodiments, the frequency spectrum is substituted by an autocorrelation spectrum to improve signal to noise.

In some embodiments, a fracture tortuosity and/or a near-borehole fracture complexity is determined by structure and behavior of resonant structures during fracture treatment pumping.

In some embodiments, the determined borehole condition takes account of dampening of resonant modes caused by a presence of fluids having a particular viscosity.

In some embodiments, a sharpness of resonance, i.e., a resonance quality factor (Q) of the borehole is used to estimate the borehole condition.

In some embodiments, determining changes in resonant mode frequency of induced pressure waves with respect to time is related to physical parameters of at least one of fractures in the formation and wellbore condition.

A method for characterizing perforations open to formations outside a borehole casing between similarly treated stages according to another aspect of the present disclosure includes evaluating fracture conductivity in at least one fracture treatment stage, evaluating fracture conductivity in at least another fracture treatment stage with same or different number of clusters, determining a ratio of conductivities between the stages, and determining a ratio of and number of "open" perforation clusters between the at least two fracture treatment stages differences as a rounded near-integer value of the ratio between the two conductivities.

Other aspects and advantages will be apparent from the description and claims that follow.

DETAILED DESCRIPTION

Figure 1:
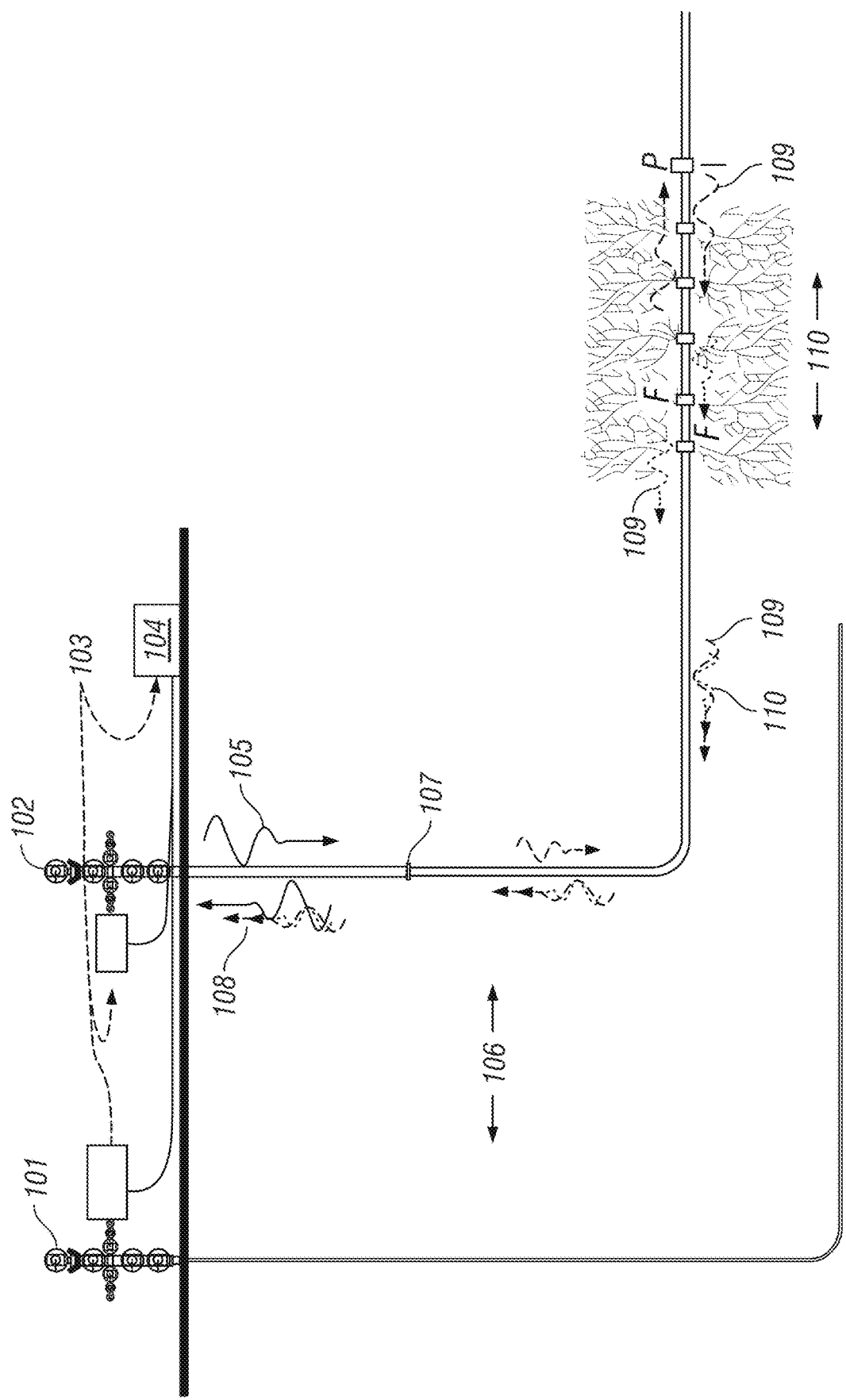
FIG. 1 shows an example procedure for a borehole or a set of boreholes can be instrumented. Instrumentation on the surface as well as major components of the borehole and fracture treatment subsurface are depicted. Wells 101 and 102 are instrumented with sensors and pulse sources 103, connected to a data acquisition system 104. Pulses, 105, are generated and travel downhole. Wells penetrate an earthen formation of interest, 106, with a hydrocarbon rich formation 110. Some wells may have a casing or other changes, 107, which result in pulse reflection 108 (darkest color). Other surface pulse reflections reflect off fractures F, 109, and plug P, 110, depicted by two gray arrowed pulse trains.

A borehole may be instrumented as is schematically depicted in FIG. 1. A well, 101, 102 whether it is a fluid producing borehole or a fluid injection borehole may have at the surface a wellhead having one or more valves that control fluid flow into and out of the borehole 101, 102. The wellhead may comprise a flow line fluidly connected to the wellhead, and may include a wing valve to close the flow line to fluid flow when required. A fluid line connects the flow line to either a fluid source such as from a pressurized container/injection system (not shown) or a fluid receptacle such as a surface treatment system of types known in the art. The fluid line connection to the fluid source or receptacle will depend on whether the borehole is a producing borehole or an injection borehole. A seismic energy source 103 (pressure pulse, or acoustic source) combined with a sensor/receiver, may be in fluid communication with the well, for example by placement in fluid communication with the flow line, or on the wellhead. A seismic sensor or receiver, 103, for example, a hydrophone, may be placed in fluid communication with the fluid in the borehole along with the source (103) in a similar manner, e.g., by connection to the flow line or the wellhead.

A ground surface seismic sensor such as an accelerometer, geophone, velocity meter, tiltmeter, jerk meter, microphone, or any similar sensor may be placed in contact with the ground or borehole surface for detecting certain types of acoustic signals as will be further explained below. Each borehole can be instrumented as described above, although specific borehole and field geometry will be guided by the field- and well-specific conditions. Such specific conditions may include a series of check valves in a rod-pump producer scenario. In general, closed valves or partial flow barriers should be avoided in the pathway between source/sensor and downhole reservoir formation to limit interference and unwanted reflections. However, a casing diameter change at a well-known measured depth (~500 ft+) can be used for velocity and model calibrations.

The energy source 103, seismic sensor(s) and any ground surface seismic sensor(s) may be in signal communication with a control and recording device (DAQ, 104). The control and recording device 104 may comprise (none of the following shown separately) a seismic energy source controller, a seismic signal detector, a signal digitizer, power supply/source, and a recording device to record the digitized detected seismic signals from the seismic receiver and the ground surface seismic sensor. The source controller (not shown) may be configured to actuate the seismic energy source SRC at selected times and cause the sensors to detect seismic signals at selected times, or substantially continuously, as well as its reflections 108, 109, 110. Any form of pulsing can be used that excites pressure waves, for example a half-sine, sine, or a chirp pulse to increase signal-to-noise ratio. The control and recording device 104 may comprise an absolute time reference signal detector, for example, a global positioning system (GPS) satellite signal receiver or a global navigation satellite system (GNSS) signal receiver. The absolute time reference signal detector may be used to synchronize operation of the control and recording device DAQ with similar control and recording devices on other wells that penetrate a selected subsurface formation or reservoir. All of these devices may be operated remotely. Injection, stimulated, zipper-fractured, producing or any other fluid-filled observation wells may be similarly instrumented in the same area. Any adjacent, or nearby wells can also be similarly instrumented to acquire data on between-borehole communication. Some wells may be instrumented only using sensors, without the need of an active seismic/pressure source.

1. Overview of the Methods, and Graphs to Illustrate Some Fracture Stages and Borehole Resonance Phenomena Data recorded, e.g., as acquired in FIG. 1, for the following analysis includes tube waves and general pressure fluctuations, including resonances thereof. To implement the current methods in practice, there are 2 types of signals used for processing. A) An "active" signal when a pressure pulse is generated at the surface (or at perforations) and B) "passive" signals, that are generated during fracturing operation noise, which excites certain characteristic frequencies of the system.

In case of A) a slug of fluid can be inserted or rapidly accelerated within the wellbore, a valve closed quickly, a pump shut down quickly, or another activity typically associated with generating water hammer.

In the most simplest case, the active pulses reflection times can be measured, and fit to a basic series of models of the wellbore, as is shown in sections 2, 3, 4. The next step in analysis is processing the data either using a reflectivity method (described in section 7) for active pulses. This method uses active pulses, and their reflections and properties of the reflections to invert for the features of the wellbore and near-wellbore region. Note that reflectivity analysis can be performed on a series of successive pulses as the basis for descriptions of the method occurring in section.

Section 5 relies on a ratio of conductivity values calculated in Section 7 below. Section 6 is apart, as it relies solely on pressure decay and a radial model of the fractures. Sections 5, 8, 9 show different way of application and interpretation of time series of fracture or wellbore bottom properties inversion as it relates to cluster activation (sec 5), (sec 8), conductivity comparison between stages (sec 11), fracture closure over time (sec 13), and gel presence/breakdown (sec 14).

In case of B), the pumping process or the fracturing treatment process itself generates a large amount of background noise and drives certain frequencies and resonances characteristic for the system. Those can be related to various changes of the wellbore-fracture system. The case B) methods are highlighted in sections 9, 10, 11 below.

Figure 2:
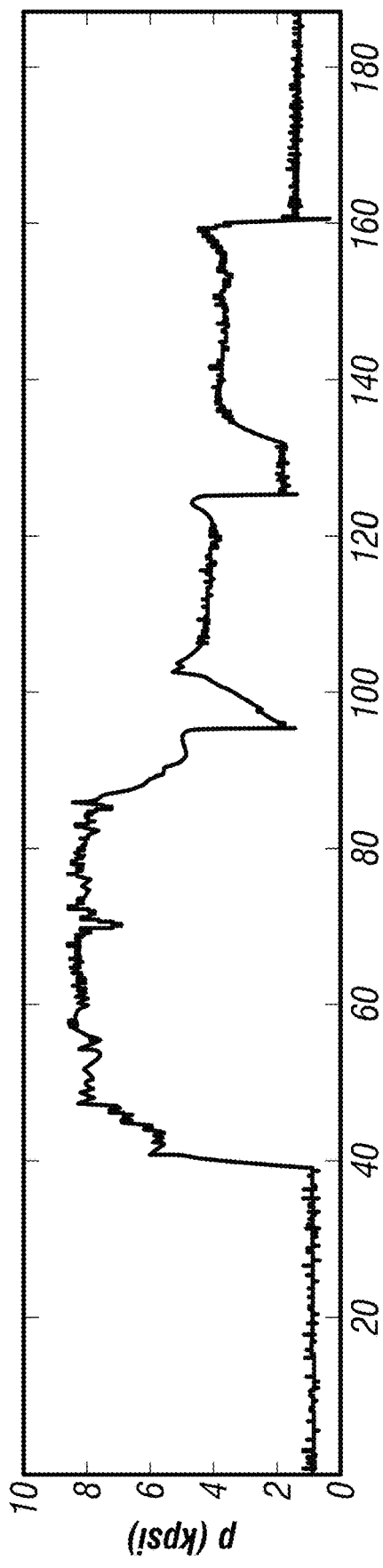
FIG. 2 shows a pumping of a stage over a time period of treatment. Top section shows a familiar pressure plot, while bottom part depicts a spectrogram with marked shifts and an anomaly in an example frequency.
Figure 2:
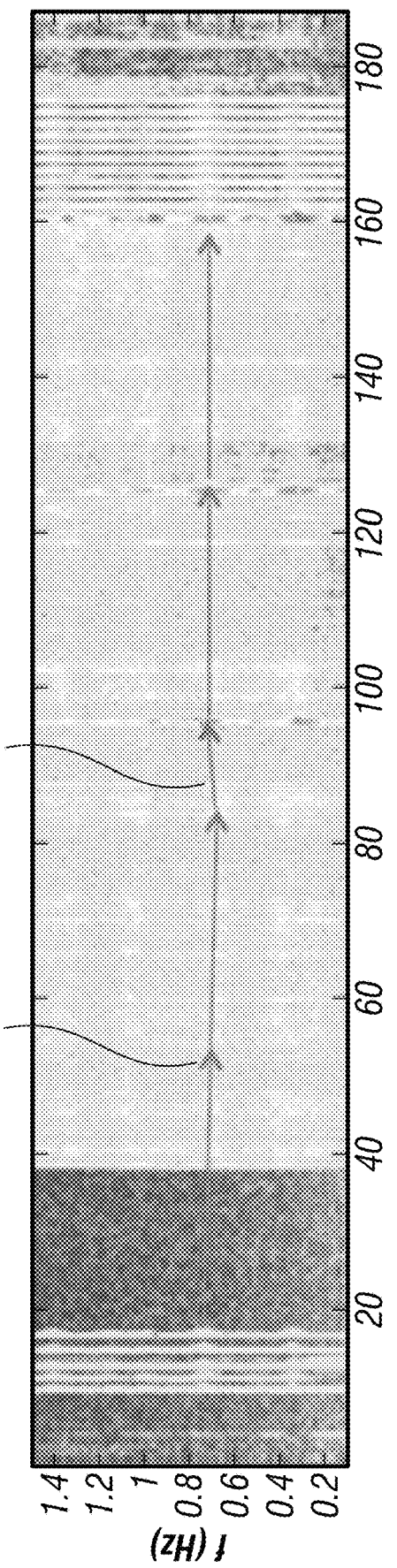
Figure 3:
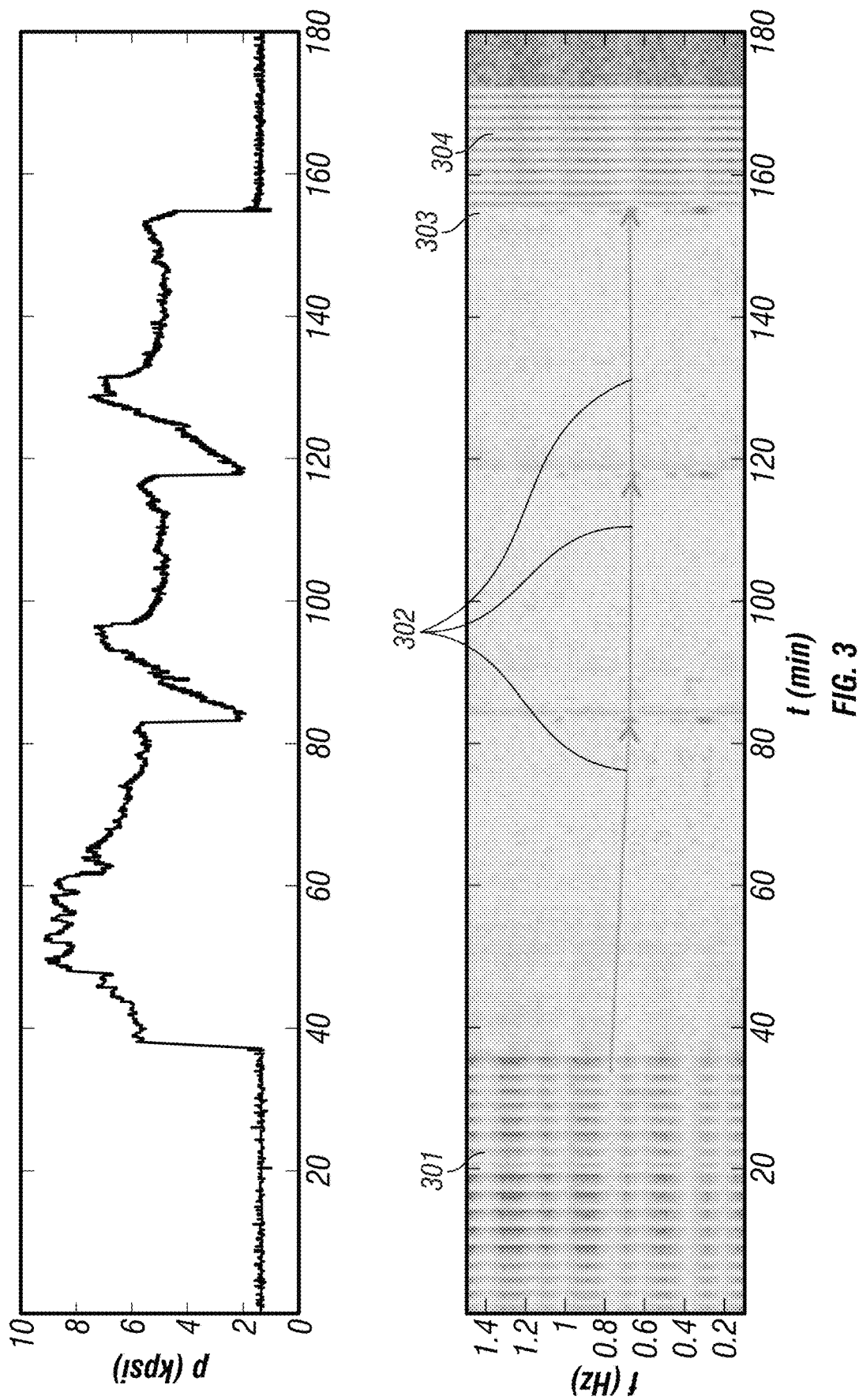
FIG. 3 shows a pumping of a stage, detailing portions where purposefully induced resonances are before (301 and after, 304), along with pump shutdown water hammer (303). Moreover, the figure shows a highly absorptive fluid system during pumping as resonances during pumping (302) are apparent but attenuated.
Figure 4:
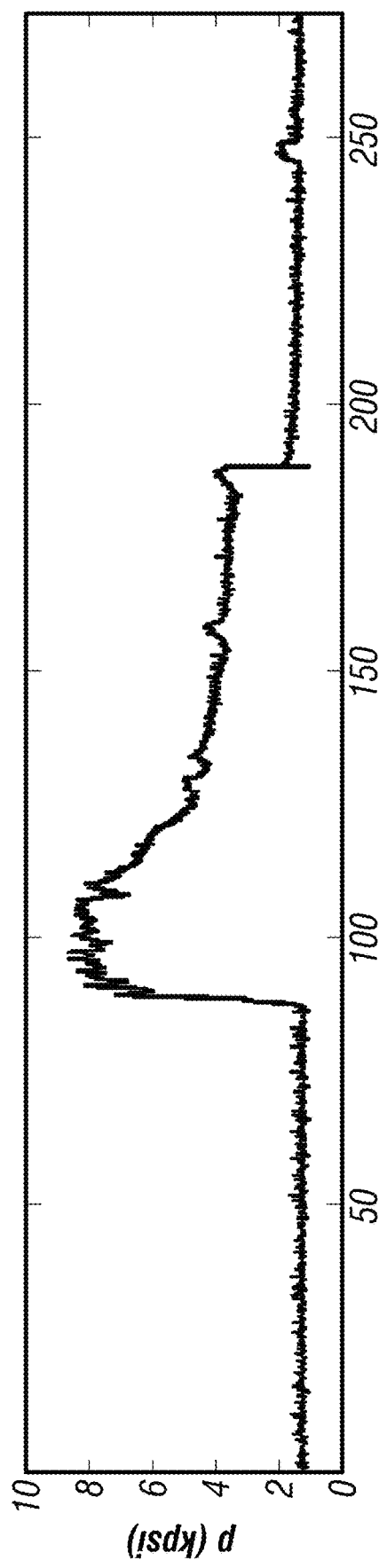
FIG. 4 shows a borehole developed resonances 401 through the pumping of a stage. Additional implication is that the fluid is potentially low-attenuation, and resonances are clearly visible.
Figure 4:
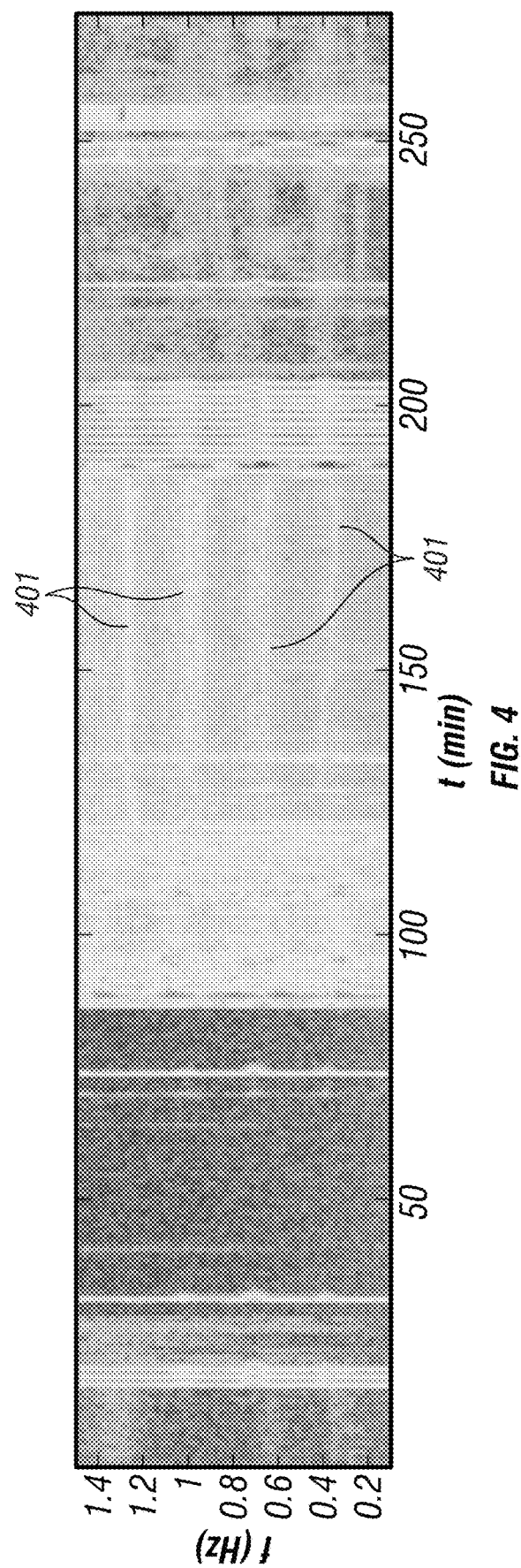

For the passive data, two alternative displays are (1) the K-graph, which is a spectrogram to assist visualizing borehole-fracture resonant energy, and (2) a time trace of the sensor data. K-graphs display time domain signals converted to the frequency domain. The following figures apply: FIG. 2 which shows an example K-graph exhibiting frequency shift and a possible anomaly, at 201, 201 respectively. FIG. 3 shows a K-graph: pre-fracture treatment, active (301), passive (302), water-hammer induced (303) and post-fracture treatment active resonances 304. FIG. 4 is an example K-graph showing a well-developed resonance.

Figure 5:
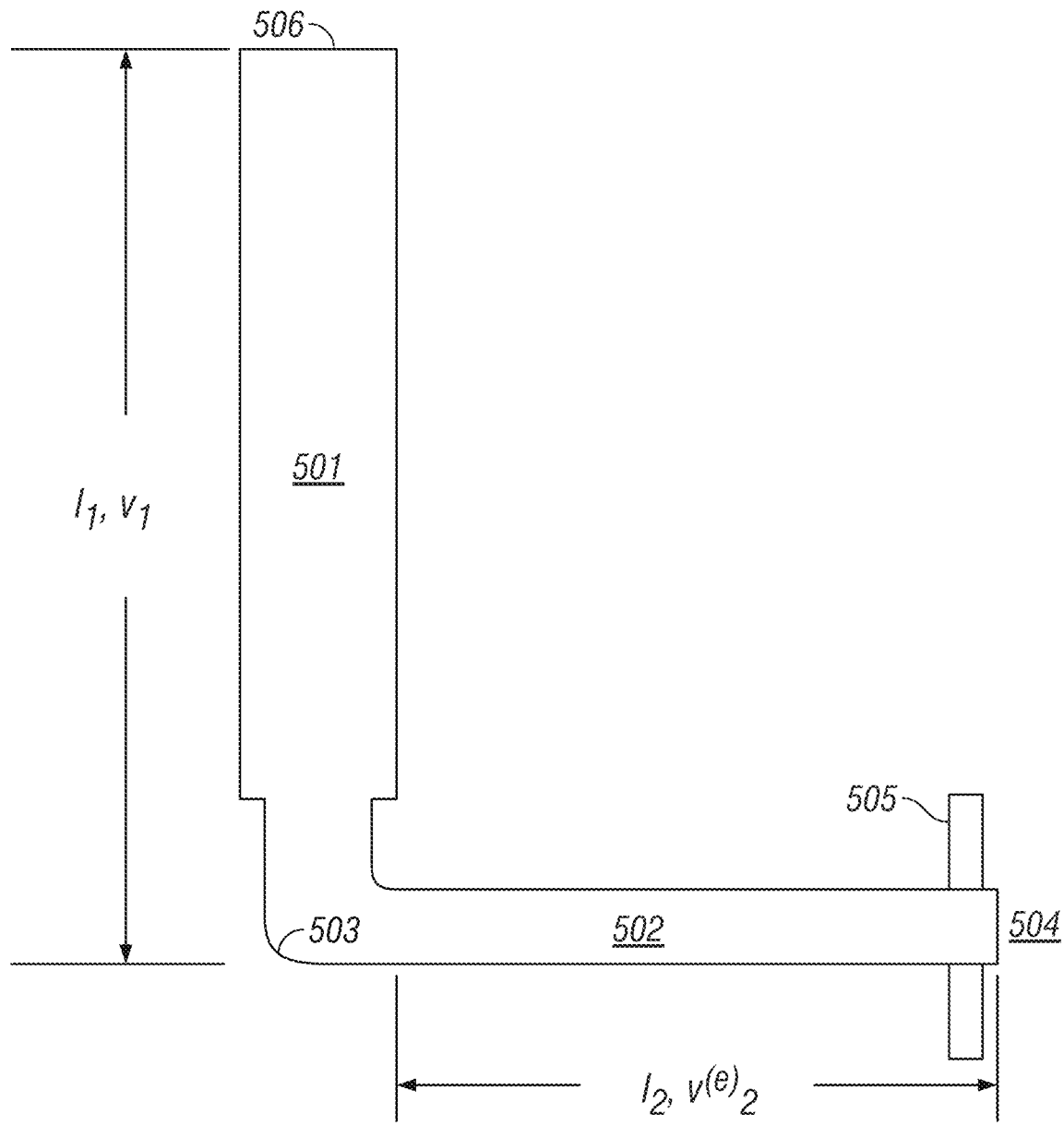
FIG. 5 shows a sketch of a borehole to calculate fracture-related velocity difference (FVD). Note that the tube wave propagation is in 1D along the borehole. Other relevant borehole features are also depicted. The expectation is that each region of the borehole will have slightly different properties and propagation velocities. The intermediate casing region, 501, has length $l_1$, tube wave velocity $v_1$. The production casing, 502, is connected with the intermediate casing in a region of changed diameter, 503. The main reflection of tube wave will come from the plug, 504. Stimulated region with perforations and fracture is 505. FVD is defined as $(v_1-v^{(eff)}_2)/v_1$, where $v_1$ is a tube wave velocity in the intermediate casing, $v^{(eff)}_2$ js an effective tube wave velocity in the production casing, and $l_1$, $l_2$ are the intermediate/surface and production casing lengths respectively. Surface and source location are at 506. Not to scale.

K-graphs, such as FIG. 2, are spectrograms of the data, provide a tool to quickly visualize, perform quality control, and interpret active controlled source and passive the acquired data. A borehole schematic with sections and elements of interest can be simplified as shown in FIG. 5. More quantitative interpretations on such data are presented in following sections. It should be pointed out that the frequency shift and fracture-related velocity difference, FVD (see the following section) are closely related. The downshift (201) of the resonant frequency in the frequency domain corresponds to an FVD increase in time domain. FVD is a more robust measurement than frequency shift alone, taking into account the physics of the system. K-graphs may be used to identify unusual/suspect events during operation, while also analyzing frequency shifts. Alternative computation can yield similar graphs (e.g. FIGS. 28, 29) using autocorrelation function time delay in successive intervals, which will be shown and discussed subsequently.

Data used in the following analysis includes tube waves and general pressure fluctuations, including resonances that can be generated during the stimulation operations either by the operation of an active source—for example ejecting or inserting a volume of fluid into the system—or "passive" source, i.e. general noise, pumping, and operational or seismic backgrounds. K-graphs display time domain signals converted to a frequency domain. Additionally, as will be explained with reference to FIG. 27, one can pick a certain frequency or resonant mode from the spectrum, and follow its changes throughout the stimulation operation to match borehole condition changes die to various variations in pumping rates, fluid (or sand) concentrations, pressures, or changes in borehole bottom and borehole conditions.

The K-graph shown in FIG. 2 depicts how the resonant frequency of borehole tube waves may vary over time 201, 202. Typically, the resonant frequency downshifts (201) as fracture grows and extends. An abnormal resonance pattern (202) may indicate a change in the fracture treatment operation, higher density fluid filling the borehole or accumulating near the perforation area, or another event of significance (e.g., fracture treatment screen out or higher density fluid present in borehole). The fracture fluid properties and content can also affect resonant frequencies and resonance strength.

2. Fracture-Related Velocity Difference (FVD)

For the description below, refer to FIG. 5. FVD is defined as:

$$FVD=(v_1-v^{(e)}_2)/v_1,$$

where $v_1$ is tube wave velocity of intermediate casing, and $v^{(e)}_2$ is effective tube wave velocity of production casing.

As shown in FIG. 5, often the borehole has an intermediate casing and a production casing. Reflections from casing joints and plugs may be present in the tube wave data. Velocities $v_1$ and $v^{(e)}_2$ can be estimated from these tube wave reflections.

Figure 6:
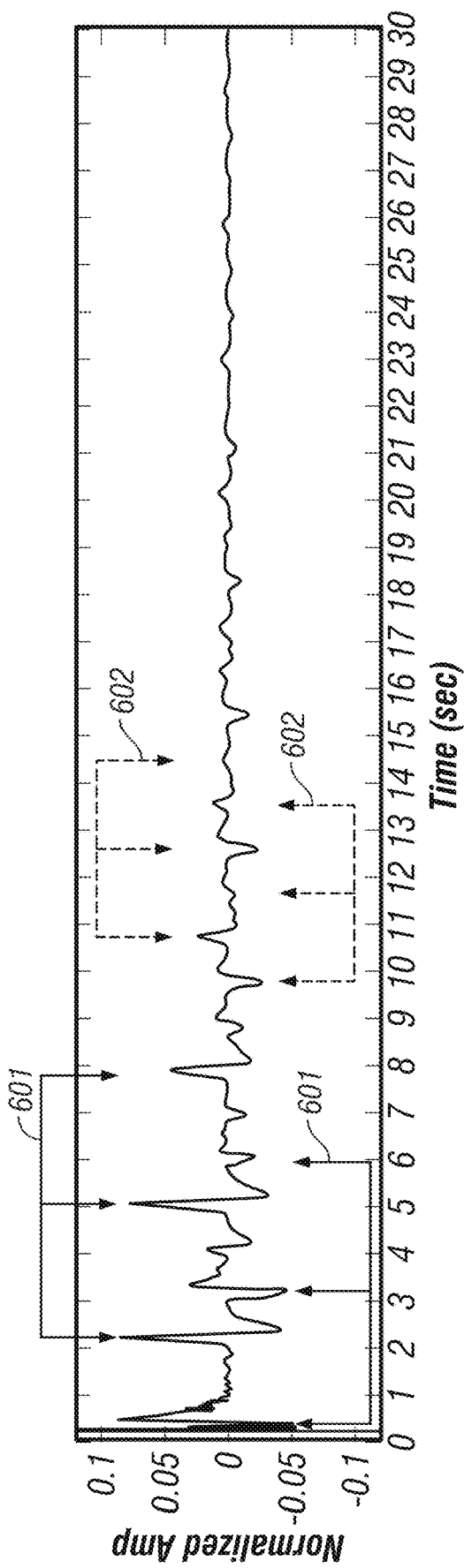
FIG. 6 shows a time series of an active pulse and its reflections from both production and intermediate casing boundaries. Bottom plot shows overlaid autocorrelation function for several pulses. Note that multiple pulses are overlapped using different shades of gray. This figure uses the assumption that v1=c1 and v2=c2.
Figure 6:
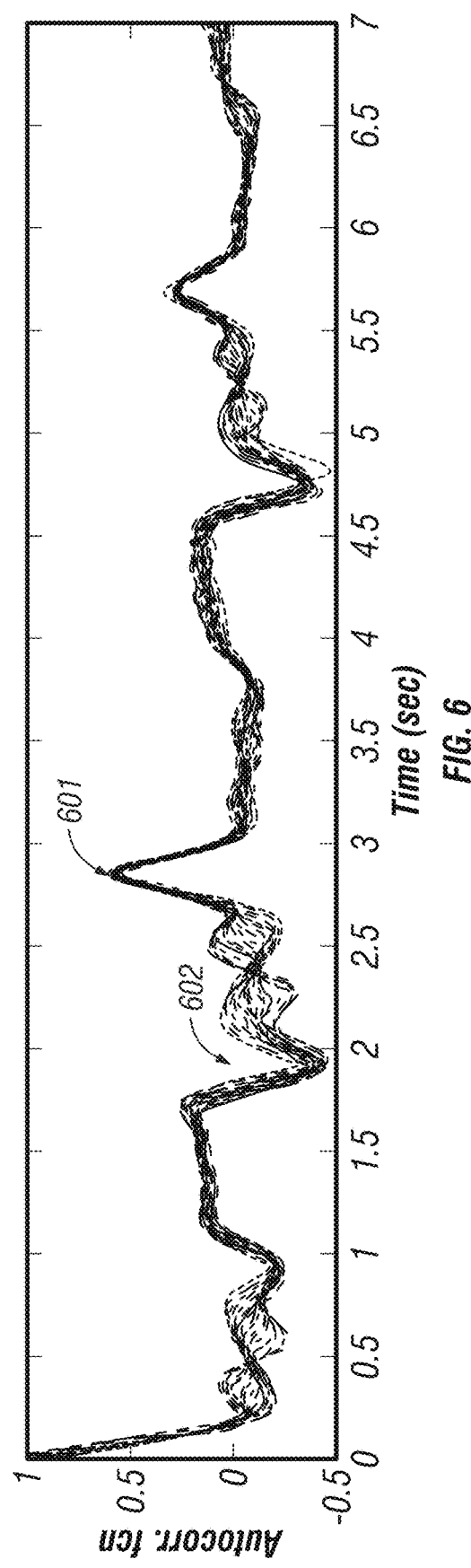
Figure 7:
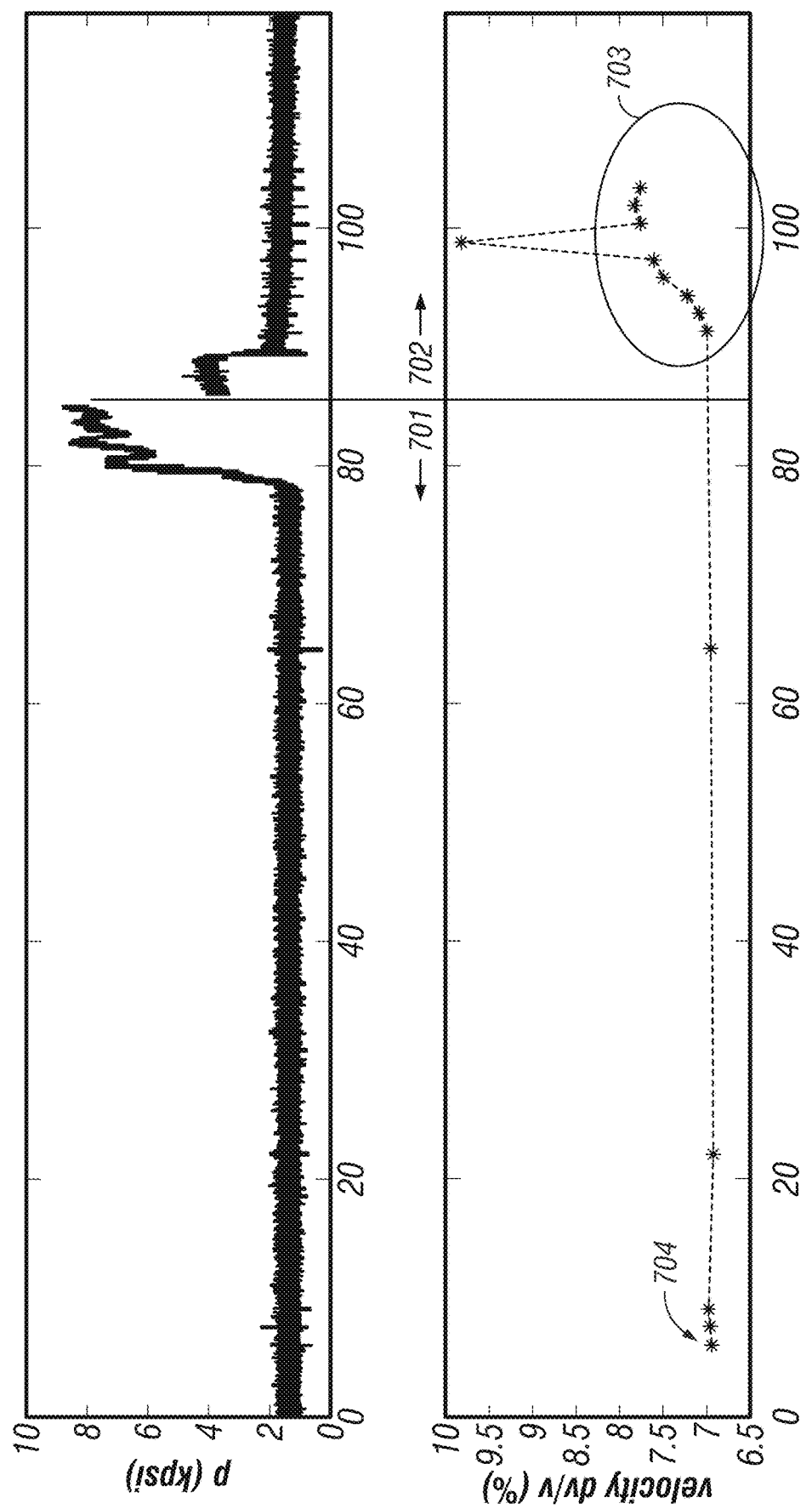
FIG. 7 shows an example of processed data with FVD (fracture-related velocity difference) pre- and post-fracturing treatment on 2 different stages. FVD trends are depicted in the lower portion of each graph. Two regions, before and after hydraulic fracturing treatment (701, and 702) are shown, time scale being arbitrary, with the treatment in between omitted. 704 in the figure shows active pulses that were converted to FVD, while 703, and 705 shows opposite trends post fracturing for the 2 different stages.
Figure 7:
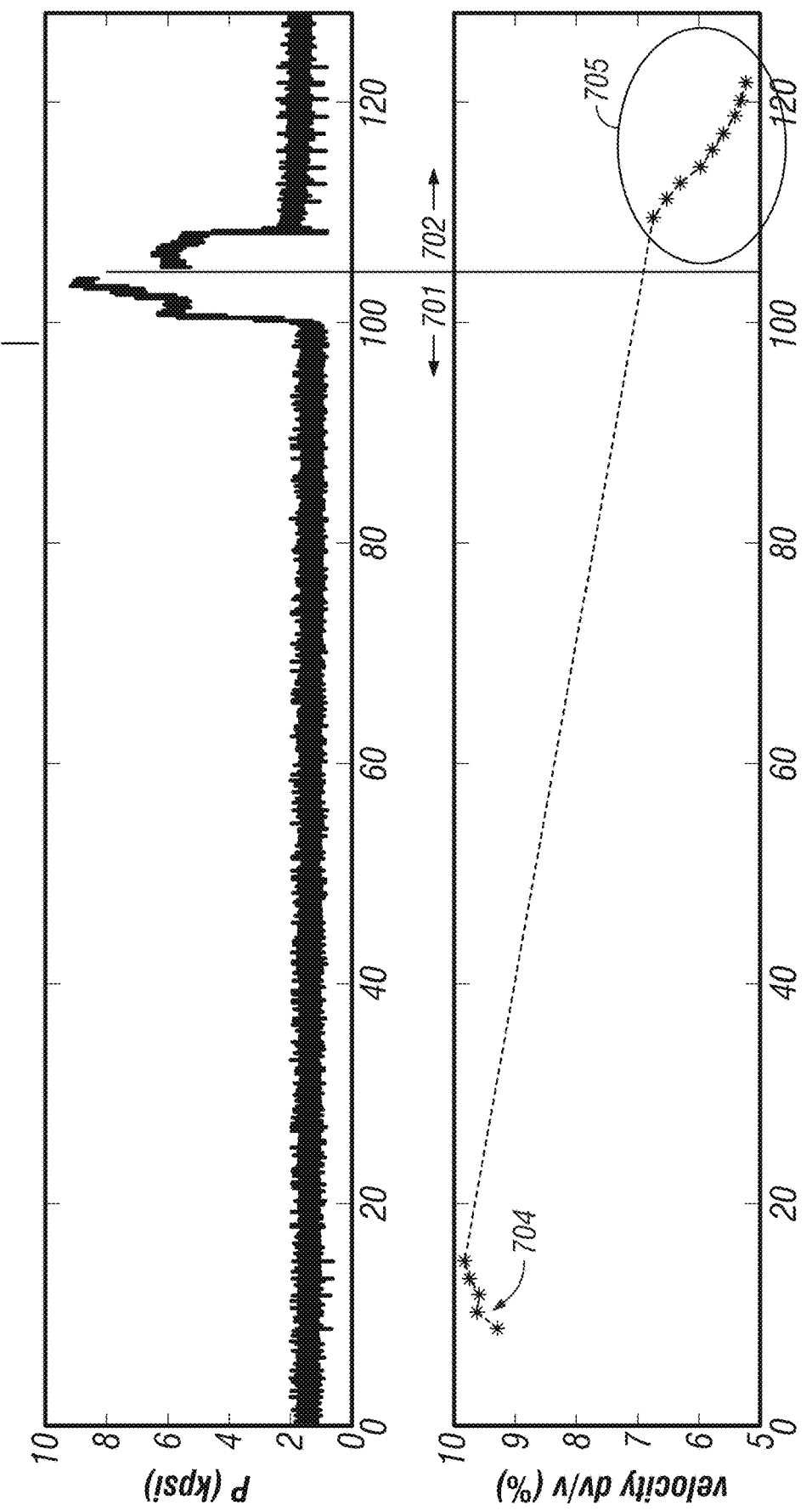

FIG. 6 includes example data showing an example embodiment of how to estimate $v_1$ and $v^{(e)}_2$, in this case using an autocorrelation function. Intermediate casing reflections, 601, and production casing reflections, 602, can be observed in the top panel of FIG. 6. The autocorrelation of the reflection data in the lower graph shows a corresponding peak (601) and a valley (602). The corresponding peak (601) corresponds to the positive casing reflection which provides an estimate of $v_1$=1507 m/s. The valley shows the negative casing reflection which leads to an estimate of $v^{(e)}_2$=1410 m/s. FIG. 7 shows example of processed data with measurements of FVD made before, at 701, and made after, at 702, a fracturing treatment along with trends 703, 704 705, for two different stages.

Velocity $v^{(e)}_2$ is an effective velocity which is influenced by perforations in the borehole casing, fractures near the plug at the bottom of the borehole, fractures around or connected to the borehole fluid, therefore $v^{(e)}_2$ comprises information about the fractures fluidly connected to the borehole (for example through perforations). Normally the existence of perforations and fractures results in a smaller $v^{(e)}_2$, but has little effect on $v_1$. In fact, $v_1$ changes relatively minimally from one stage of a fracture treatment to the next as long as the fluids in top portion of the borehole remain substantially the same It can be observed from the definition of FVD, that a smaller $v_2$ means a larger FVD. When interpreting FVD data, a larger FVD corresponds to a larger hydraulic connection between borehole and fractures.

Moreover, the post-fracture treatment FVD vs. time plot for a given stage over a longer time frame can indicate how fast downhole conditions in section $l_2$ and beyond vary with time (e.g., if a gel breaks down or how fast the fractures close). Because difference is used in this data processing, Fracture-related Velocity Difference (FVD) tends to cancel out certain common sources of noise, such as fluctuations of pressure, temperatures, and fluid contents. This feature makes the interpretation of FVD very robust.

Figure 23:
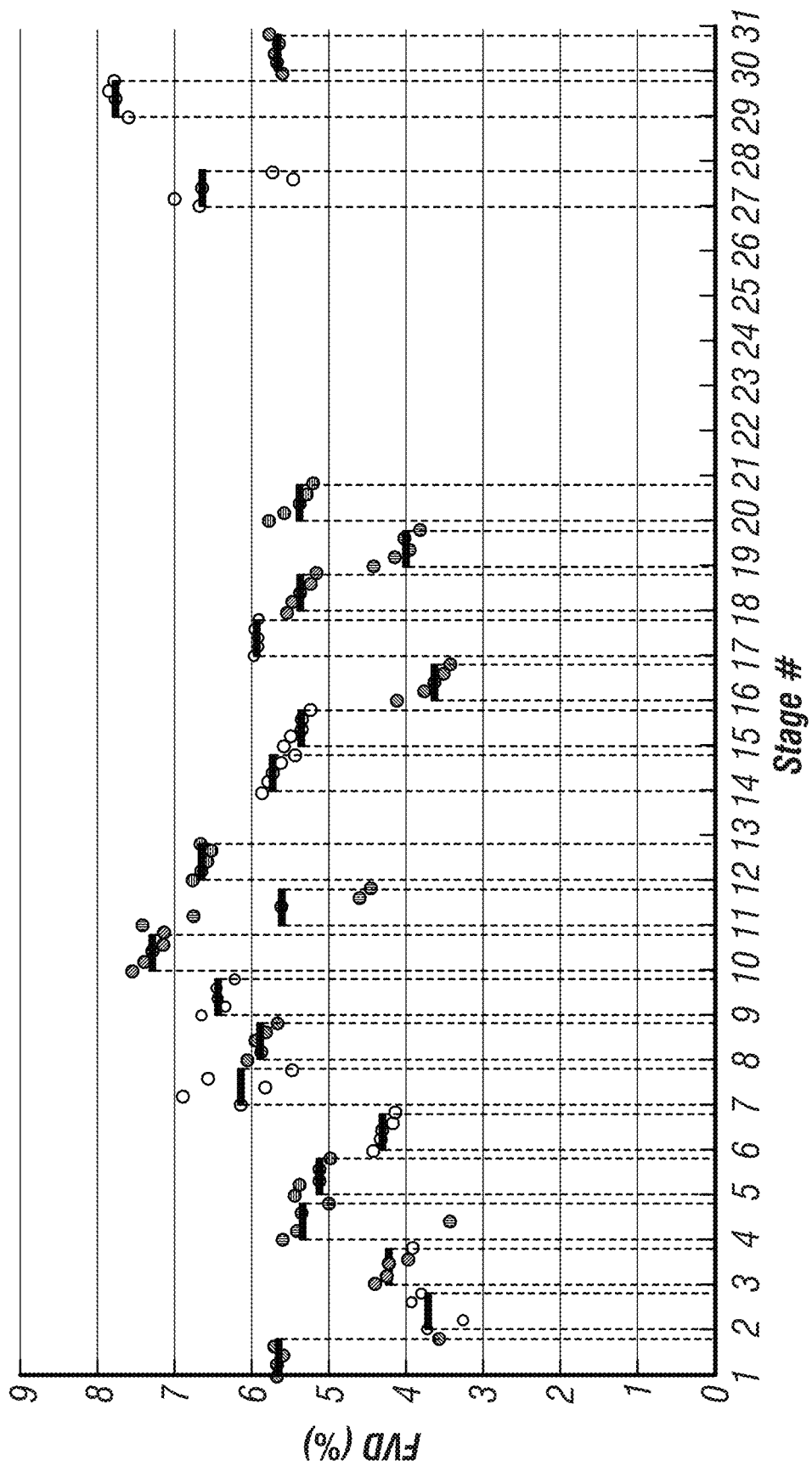
FIG. 23 shows post-fracturing measurements of fracture velocity difference, FVD across many stages of a borehole for each pulse (represented by a dot). Two types of variations can be observed: 1. within a stage, represented by dots; and 2. an average value comparable across stages. The within stage changes correspond to density changes and fracture closure and exhibit a decreasing trend over most stages. The variations of averages between stages are related to variations between fracture conductivity for each stage. Note that only stages 17, 29, and 30 have a flat or slightly increasing trend.

Reflections from casing joints and plug(s), among other features, may be present in the tube wave data, and $v_1$ and $v_2$ can be estimated from the reflection times of a pulse traversing a borehole (FIG. 6 at the top). Normally the existence of perforations in the casing and fractures results in a lower $v^{(e)}_2$ than the "true" tube wave velocity $v_2$. From the data, one can calculate $v^{(e)}_2$, which is an effective velocity influenced by perforations and fractures near the plug. For an entire borehole, a graph may be made to compare across many stages as shown in FIG. 23.

3. Fracture Wave Depth (FWD)

Figure 8:
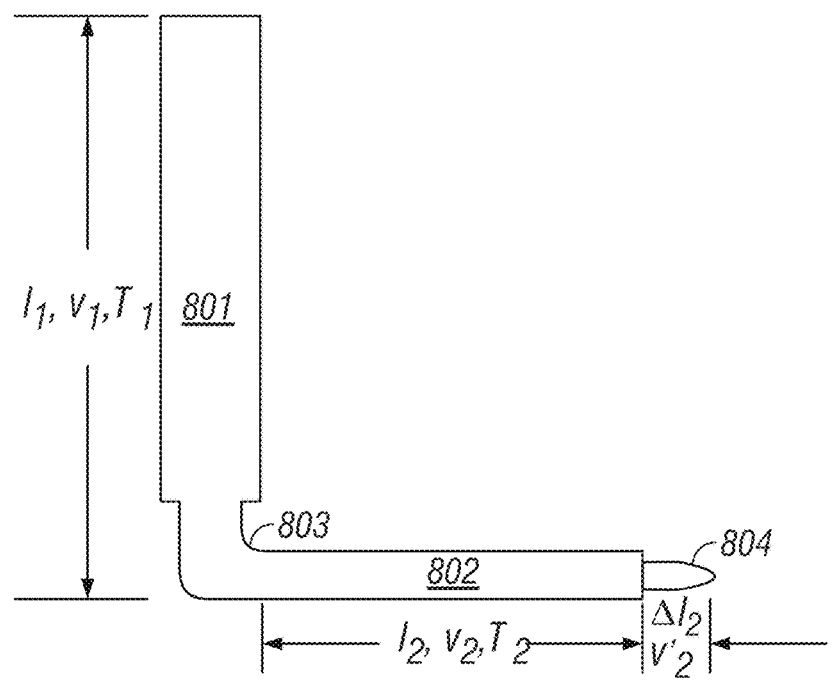
FIG. 8 shows a schematic for a fracture-wave depth (FWD) approach. Two portions of borehole casing are shown, the surface/intermediate casing, 801, and the production casing, 802, separated by a casing joint region, 803. 804 in the figure depicts depth of fractures, in line as a 1D continuation of the borehole. Figure is in 1D. FWD can be estimated as: $\Delta l2 = \Box l_2 = v'_2(T_2 - l_2T_1B/l_1)/2$, where $B=v_1/v_2$, T1, T2 are two-way travel times of tube wave reflections, and $l_1,l_2$ are the intermediate/surface and production casing lengths respectively. Not to scale.

The FVD, introduced in the previous subsection, is a data attribute. In order to provide a more quantitative interpretation, FVD may be converted into a physical parameter 412 as described in the FIG. 8. Parameter 412 is called Fracture Wave Depth (FWD) in this disclosure, and can be calculated using the following equation:

where $T_{1,2}$—Two-way travel times of tube wave reflections
$l_{1,2}$—Casing lengths $$B=v_1/v_2=\{r_{f1}(1/K_{f1}+1/M_1)/[r_{f2}(1/K_{f2}+1/M_2)]\}^{1/2}$$

$v'_6$—Assumed fracture wave speed (200 m/s is used in this report)
$K_{f1,2}$—Fluid density
$K_{f1,2}$—Fluid bulk modulus $$M_{1,2}=m+Eh_{1,2}/(2b_{1,2})$$

m—Formation shear modulus
E—Casing Young's modulus
$h_{1,2}$—Casing thickness
$b_{1,2}$—Casing inner diameter
$h/b\ll 1$ is assumed The definition of FVD and equations above, and equations (5-3, 5-13) in, *Underground Sound*, White (1983) may be used to derive the equation above. The information used to calculate 412 comprises the difference between observed effective velocity $v^{(e)}_2$ and theoretically predicted velocity $v_2$.

As shown in the formula, fluid parameters, formation parameters, casing parameters are required for an accurate estimate of fracture wave depth (FWD). Some typical numbers obtained from literature are used herein. As a result, some pre-fracture treatment FWD values are negative. FVD is very robust and does not need these model parameters.

Figure 9:
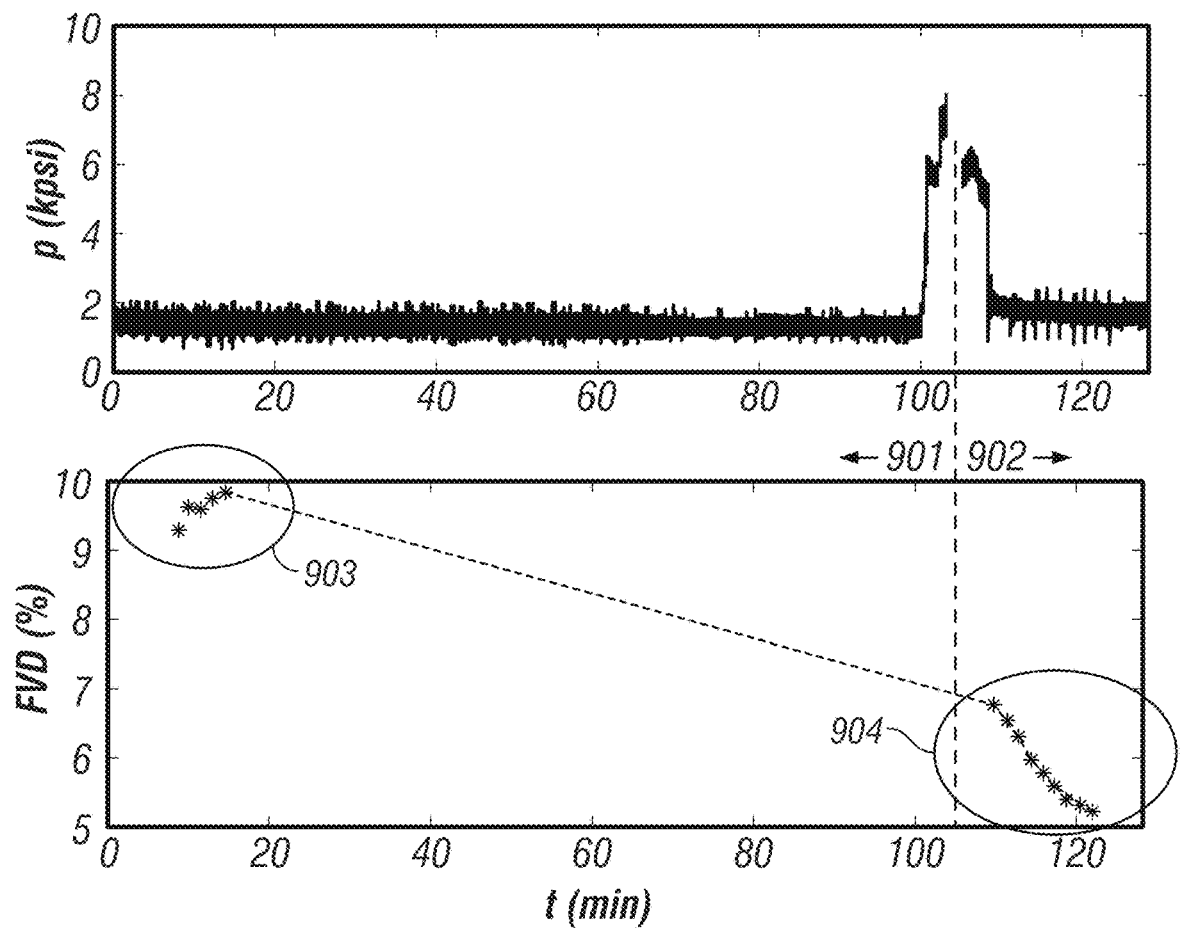
FIG. 9 shows a single stage data before (901) and after (902) a hydraulic fracturing treatment with the treatment section omitted. On the bottom graphs, both FVD and FWD approaches are compared, showing the trends of each quantity before and after. Pre-FVD is 903, post-FVD is 904, pre-FWD is 905, and post-FWD is 906.
Figure 9:
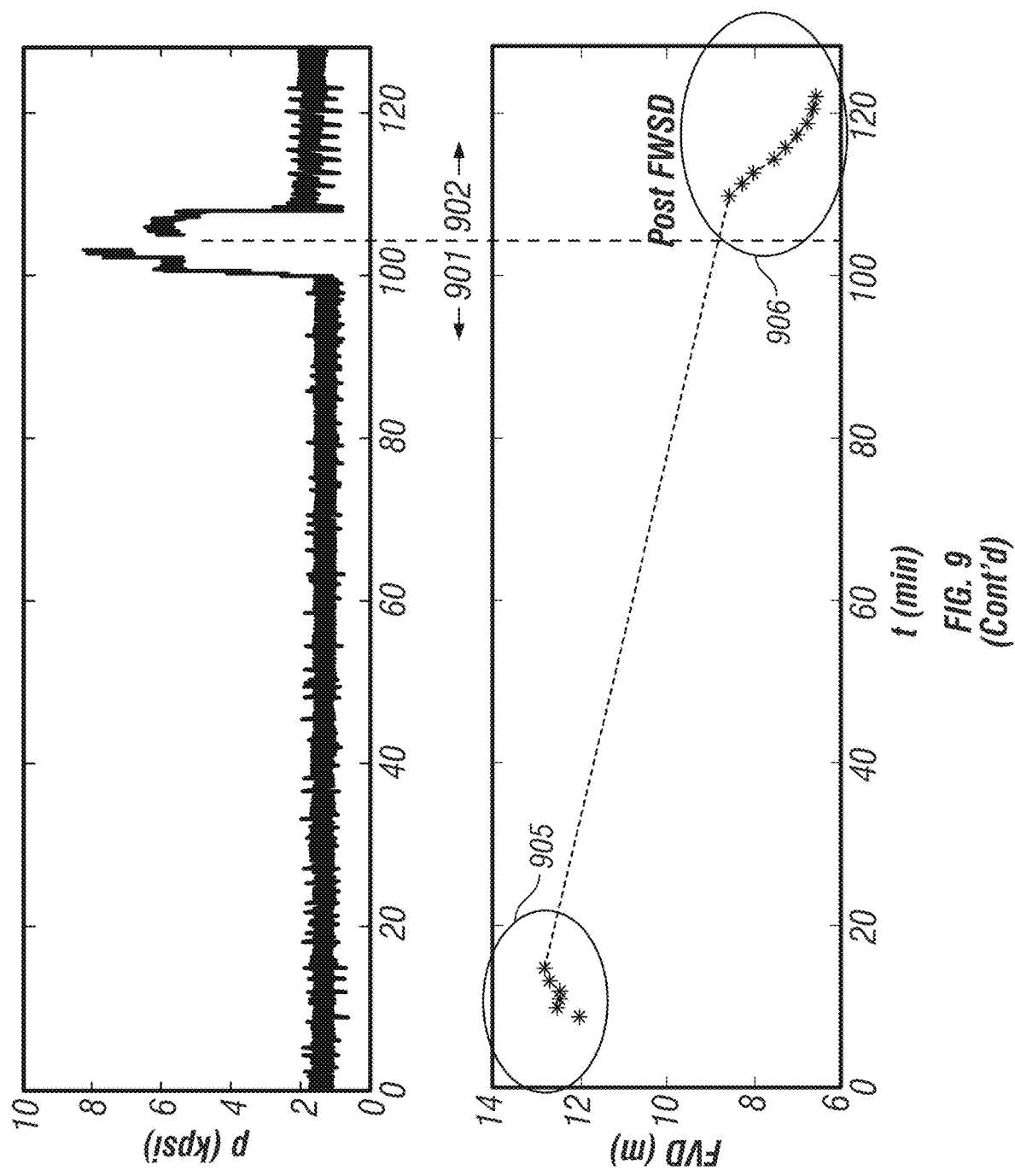
Figure 24:
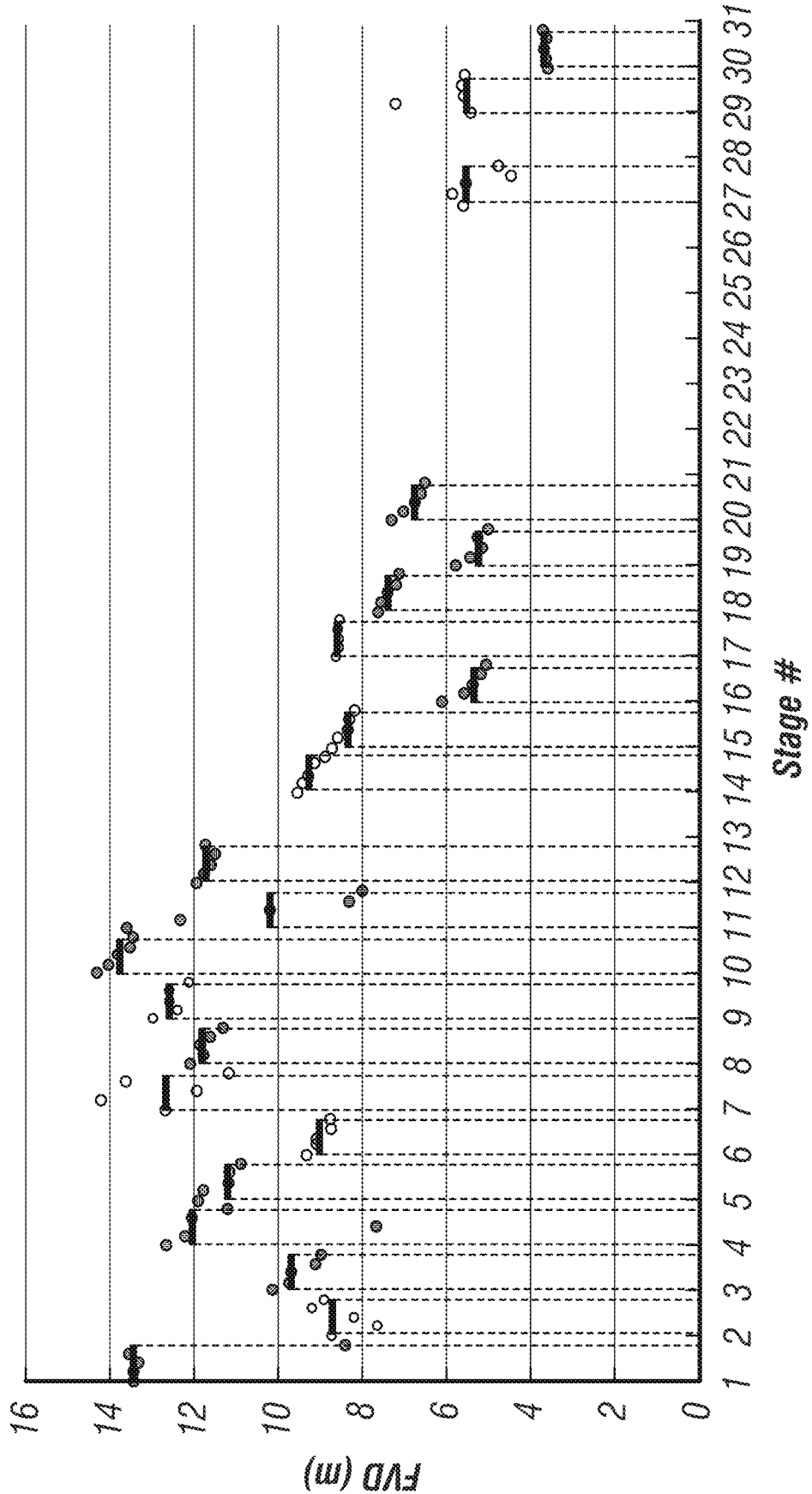
FIG. 24 shows post-fracturing measurements of fracture wave depth, FWD. This measurement corrects for different plug measured depth. Two types of variations can again be seen: 1. a within stage, represented by dots, and 2. an average value comparable across stages. Relative values of later stage (e.g. 27-30) become lower than FVD measurements. Stages 7, 8, 9, 10 appear having a deeper FWD or better borehole fracture conductivity than other stages.

FIG. 9 is a data example of FVD/FWD. It can be observed that pre-fracture treatment, at 901, and post-fracture treatment, at 902, measurements have different FVD/FWD. It is also important to analyze post-fracture treatment FVD/FWD changes over time, as shown at 903, 904, 905, 906, because the time-changing could be an indicator of density change and/or fracture closure after initial shut in pressure (ISIP). Such comparison is presented in FIG. 24. along with variations and measurements shown over many fracture treatment stages.

4. Borehole Bottom Condition (BBC)

Figure 10:
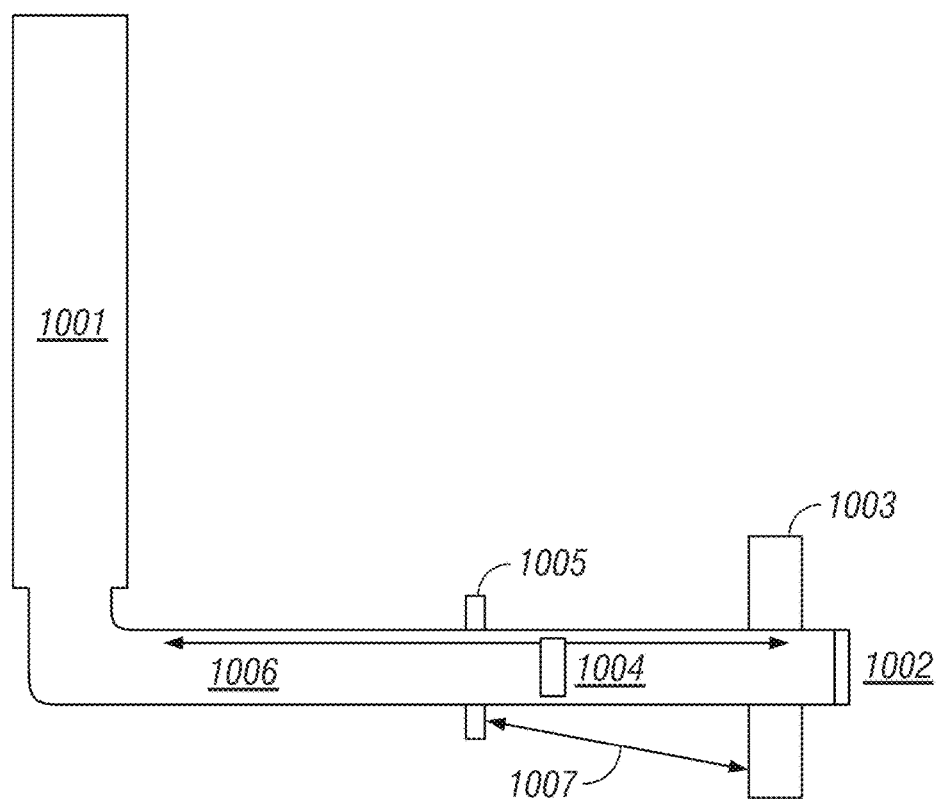
FIG. 10 shows a schematic of a borehole condition that is "open" to a prior stage. A borehole, 1001, has a properly placed and sealed plug at the latest most stage N, 1002. A fracture network and perforations from the fracturing stage N are depicted as 1003. Stage N+1 perforations and possible fracture network are 1005. A "leaky" plug, 1004, allows for interaction, 1007, between stage N+1 and N. This may be due to an improper or ineffectual placement of a bridge plug 1004. A tube wave reflection, 1006, can pass the plug 1004 and at least partially reflect off plug 1002.
Figure 11:
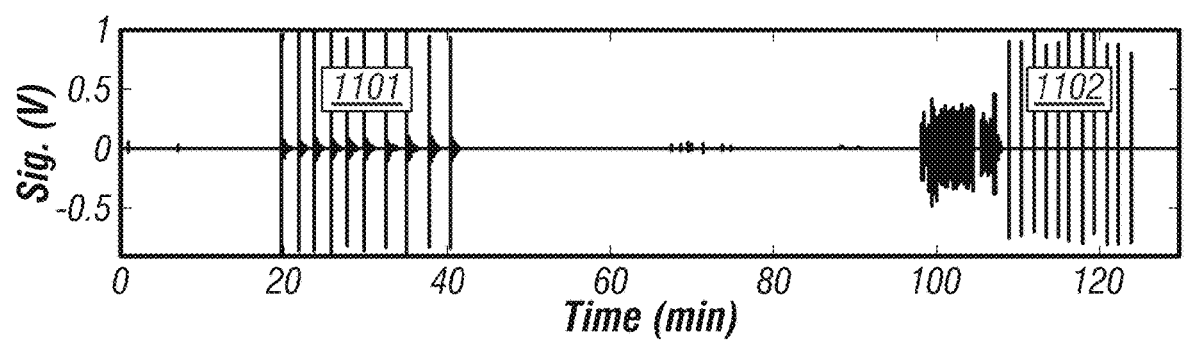
FIG. 11 shows an example analysis of data with a "closed" bottom hole boundary condition (BBC). The autocorrelation functions of pulses pre-fracture treatment (1101) after perforation and post-fracturing treatment (1102) are plotted together. The plug reflection is highlighted by a circle in the autocorrelation plot. Within this example, the plug has a positive reflection, indicating a closed BBC before (1103), while open BBC is measured post fracture treatment (1104). Stage pump time is omitted and timescale is thus arbitrary.
Figure 11:
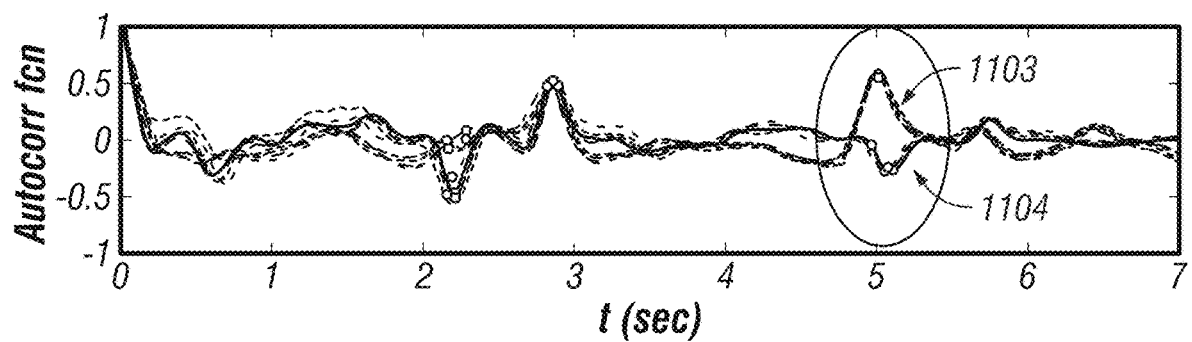

Pre-fracture measurements can indicate a state of the borehole or borehole bottom. For the following discussion, refer to FIGS. 10 through 12. "Bottom" is defined as the end of the fluid column, up to a boundary, which may as one example, be a closed plug 1002. The boundary may be a plug, 1002, or may be packer, a slug of high density fluid, or an obstruction in the borehole, all of which present a reflector or scatterer to a propagating pressure wave. The measurement is referred to as "Borehole Bottom Condition" measurement, designated by "BBC."

Before a fracturing treatment, one may expect the borehole bottom with a plug in a shale formation to be effectively "closed", i.e., not in significant hydraulic contact with a prior fracture treatment stage, or with a reservoir (formation) fracture. However, if the plug is not completely sealed or seated, there may exist a hydraulic connection to previous stage(s). Alternatively, even if the plug is fully seated and sealed, a presence of natural fractures connected through perforations to the borehole fluid would affect this condition and in turn also the BBC measurements.

Figure 12:
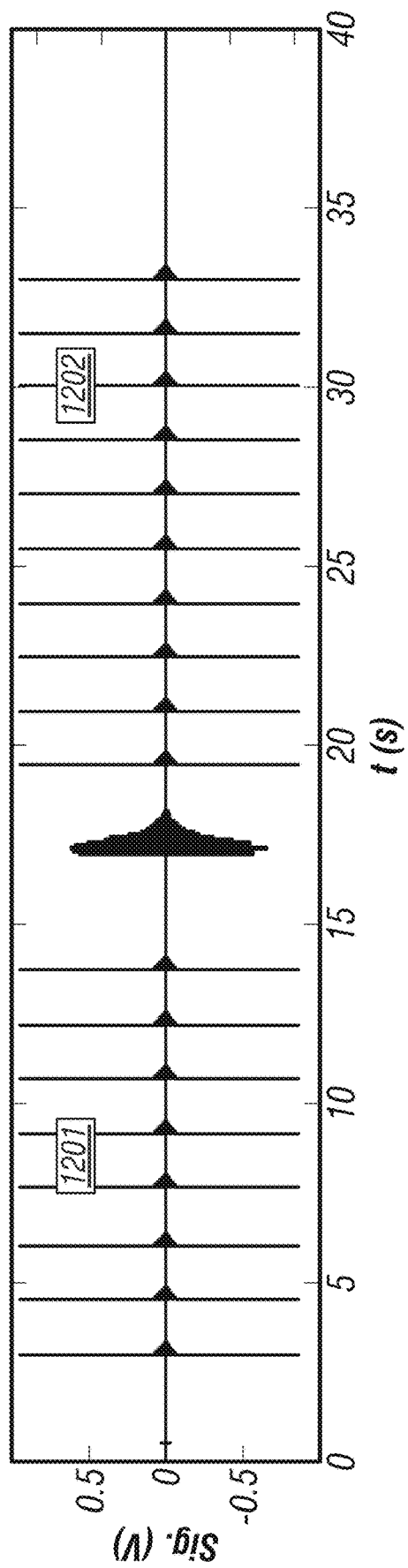
FIG. 12 shows an example opposite to that of FIG. 11, i.e., an "open" bottom hole boundary condition (BBC). Pulses before (1201) and after the hydraulic fracturing treatment (1202) as well as the opposite sign of the autocorrelation function (i.e. reflection, 1203), are highlighted. Stage pump time in the middle is omitted and timescale is thus arbitrary. Note that depicted pulses from minute 3 to minute 33 do show changes.
Figure 12:
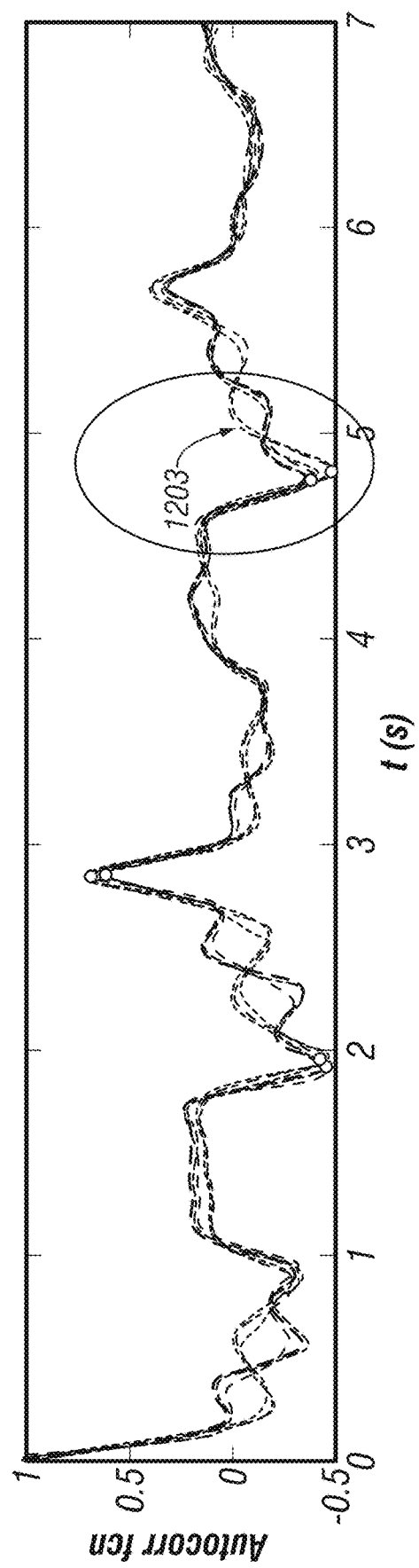

Closed BBC exhibits a positive reflection coefficient. Open BBC results in a negative reflection coefficient. Some phase shift is possible. Tube wave reflection from the plug can be used to detect the predominant BBC. Analysis, such as the one shown in FIG. 11 clearly exhibits the +/− sign (1103 and 1104) of the bottom hole reflection. Note that pre-fracturing BBC, 1101, can be either open or closed, but post-fracturing BBC, 1102, may be expected always to be open. In FIG. 12, pressure pulses before (1201) and after (1202) hydraulic fracturing treatment maintain the opposite sign of the autocorrelation function (i.e., reflection, 1203) for the open condition existing before and after the treatment. Fracture treatment "stage" pump time in the middle is omitted, and the time scale is thus arbitrary. Note, that pressure pulses indicated from minute 3 to minute 33 do show changes. Even though a more "binary" (open/closed, +/−) approach is described above, a more broad, reflectivity value from, e.g., +/−0.9 reflection coefficient in between can determine various states of the plug and the "borehole bottom." In particular, calibrating and comparing various stages with experience and other data points can result in a database of borehole bottom properties useful to an operator.

5. Stimulated Cluster Volume Quantization (SCVQ)

The Stimulated Cluster Quantization Volume (SCVQ) approach is an extension of the Reflectivity (Diffusion) Model method (explained below and described more completely in International Application Publication No. WO 2018/035498: Quan, Y. et al: "*Method for Evaluating and Monitoring Formation Fracture Treatment Using Final Pressure Waves*"). The foregoing approach can be used to determine relatively how well many perforation clusters were stimulated in a treatment by observing stage to stage variance in near-borehole conductivity. This information can be used to evaluate the efficacy of any diversion methods utilized, and may also be used as an input to post-treatment fracture and production modeling for each fracture treatment stage.

The Stimulated Cluster Quantization Volume (SCVQ) method, explained in more detail below, uses differences in stage near-borehole conductivity, measured by the Reflectivity (Diffusion) Model method, to determine how many perforation clusters were effectively stimulated by each fracture treatment. It is not unusual for a subset of all perforation clusters to take most of the fracture treatment fluid in a multi-cluster treatment. By comparing measured conductivities, one can provide the likely number of clusters that were stimulated during the treatment of any particular stage.

The Stimulated Cluster Volume Quantization (SCVQ) approach is an extension of the Diffusion Model method, and can be used to determine how well which several perforation clusters were stimulated in a treatment by observing patterns in the near-borehole conductivity. The effective number of substantially stimulated clusters can be used to evaluate the efficacy of any diversion methods, and may also be used as an input to post-treatment fracture and production modeling for each stage.

Figure 13:
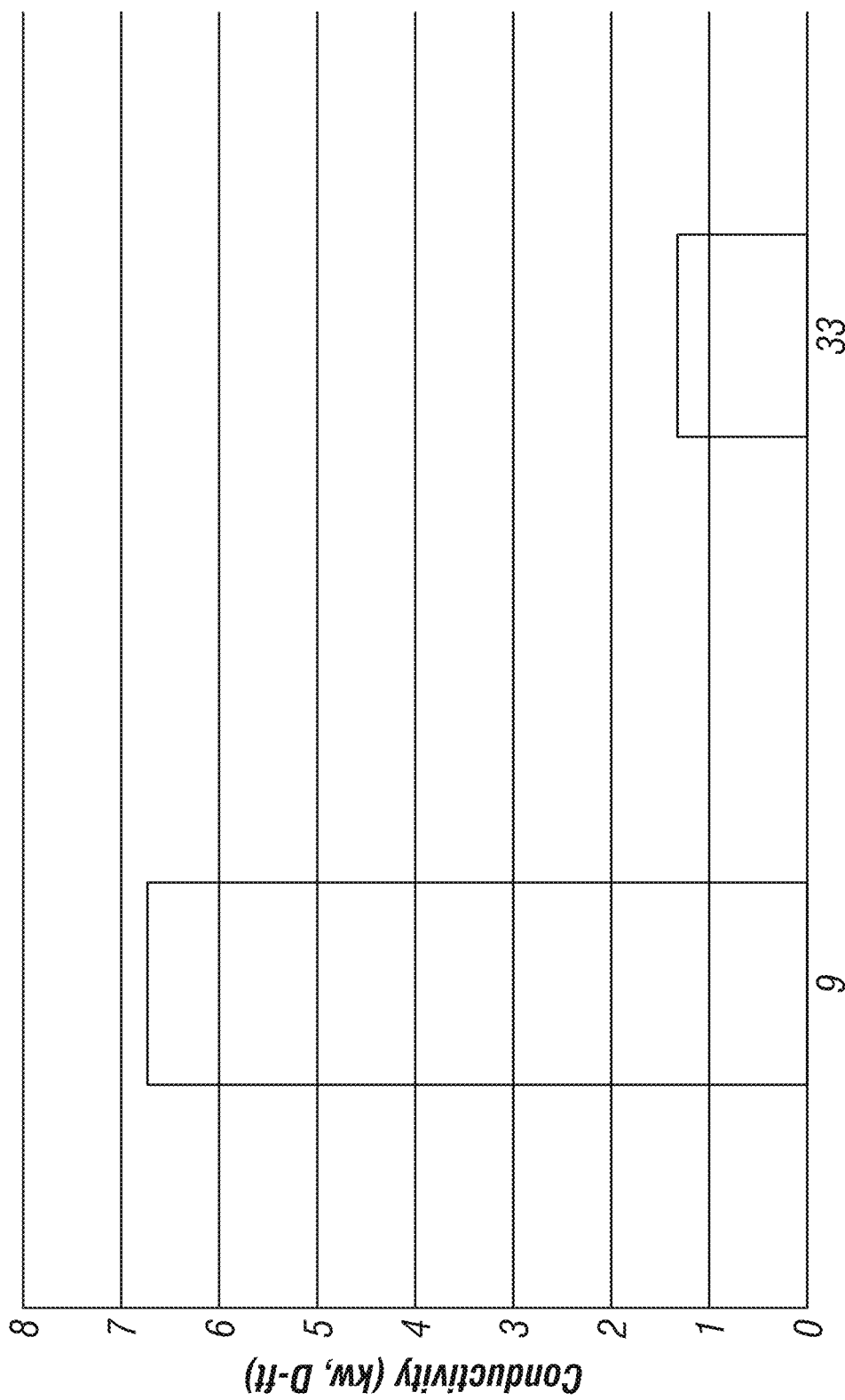
FIG. 13 shows conductivity for 2 exemplary stages (9 and 33), to demonstrate the marked difference in the conductivities, due to different completion effectiveness.

As shown in FIG. 13, conductivity (kw) computed for stage 9 is 5.6 times greater than the conductivity computed for stage 33. Five perforation clusters were stimulated in stage 9, compared to a single cluster in stage 33. The conductivity was calculated using the Reflectivity (Diffusion) Model method. Here, assuming equivalent geology and roughly equal treatment per cluster, the factor of ~5 in measured conductivity indicates that all five clusters were likely stimulated about equally in stage 9. Moreover, all 5 clusters in stage 9 would be expected to perform similarly to those in Stage 33. If a single-cluster or single perforation stage is not available as a reference, an integer ratio of calculated conductivities can be used.

Figure 25:
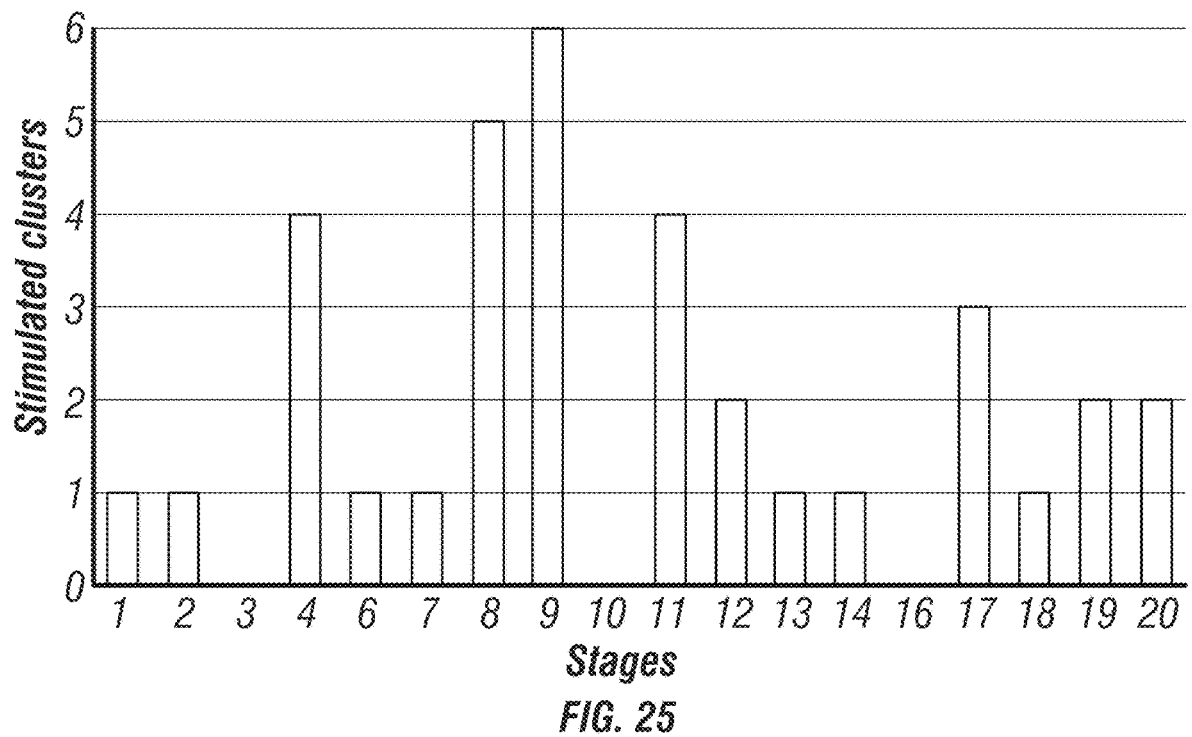
FIG. 25 shows measured number of clusters stimulated in every stage. One can see that not all clusters remain significantly stimulated.

FIG. 25 shows a number of pseudo-equally-stimulated clusters volumes calculated using the SCVQ Method. The number of clusters stimulated is derived based on patterns in the Diffusion Model results. This correlation makes certain assumptions regarding the homogeneity of geology, perforation quality and flush of the borehole with clean fluid for each stage. These assumptions can be minimized by acquiring active data during pumping.

From the measurements presented FIG. 25, one can estimate that seven stages showed primarily 1 stimulated cluster, three stages showed 2 clusters, one stage had 3 clusters, two stages had 4 clusters, one stage had 5 clusters and one had 6 clusters stimulated. Based on these results, stages 4, 8, 9, 11, and 17 may be expected to contribute more to initial production than other stages. In future treatments, a pumping diverter used during stages, e.g., 1, 2, 6, 7, 13, 14 and 18 may cause additional clusters to be substantially stimulated. This information could be available in real-time if active pressure pulse data (or another measurement of conductivity) is acquired (e.g., FIG. 1) during treatment, and processing is done in real-time. In this case, the Conductivity method may be more sensitive to overall near-borehole conductivity, while the pressure decay method, described below, may be more general and far-field responsive.

A total of six perforation clusters were created (shot) for each stage of this example well. The SCVQ approach may be used to search for patterns in the Diffusion Model conductivity to estimate how many clusters were substantially stimulated in a particular stage with a large volume of fluid. Stages with conductivities within 25% are assumed to have the same number of clusters stimulated. A certain heterogeneity of near-borehole natural fracture connectivity, perforation effectiveness, and other properties are assumed across all stages. These assumptions can be minimized if active pressure pulse data is acquired (e.g., FIG. 1) during the treatment and changes in measured conductivity are tabulated. The number of clusters stimulated for stages 3, 10 and 16 in the present example was inconclusive.

6. Effective Conductivity from Pressure Decay Analysis

Figure 14:
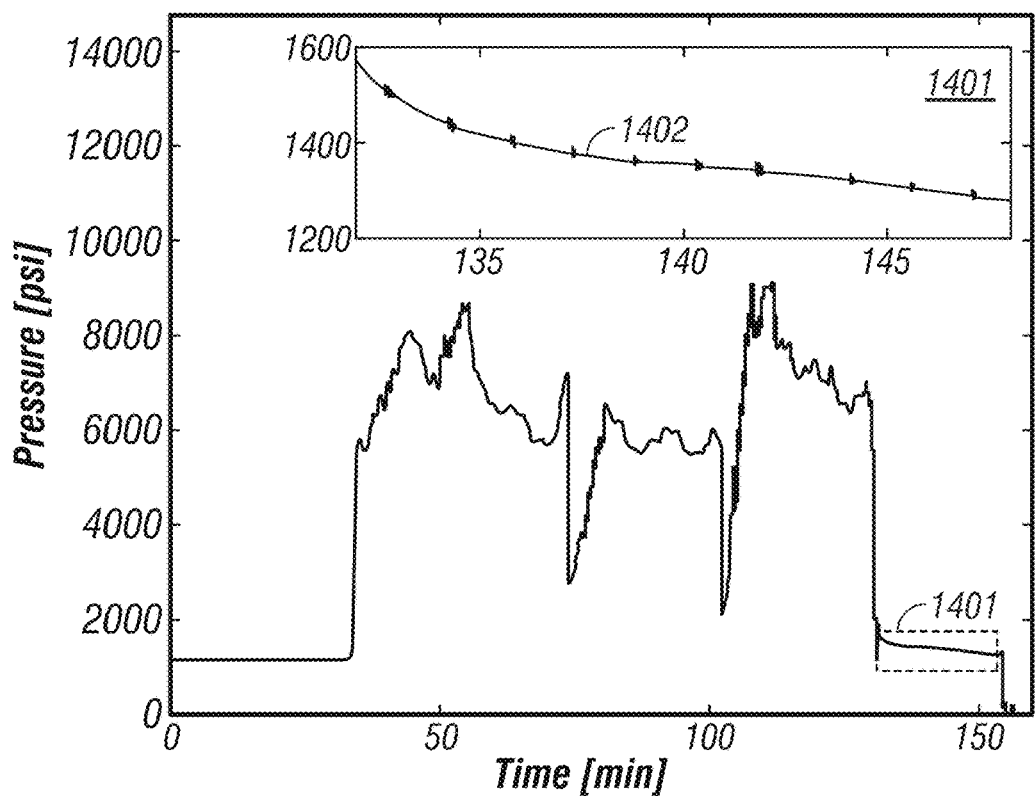
FIG. 14 shows far field conductivity measured using diffusion method from pressure. A region of interest immediately post shut-in, 1401, is enlarged.

For a fracture treatment stage, one can perform a pressure decay analysis to estimate the effective conductivity ($kw_{eff}$) of the fracture network as will be described in more detail. FIG. 14 shows an example of the fluid pressure recorded at the top of the borehole before, during and after fracturing treatment.

For the present example analysis, the first ten minutes of pressure decay after fracture treatment was selected, and after that, the borehole pressure decreased from 7500 psi to 1500 psi. During this period, a crew performed the post-fracturing active data acquisition pulses while the recorded pressure decreased on the order of 300 psi. The latter pressure decay was believed to be related to the infiltration of borehole fluid into the fracture network and the rock formation as a consequence of hydraulic diffusion. During the first few minutes of pressure decline, pressure decays exponentially, while in the second part of the decline the decay is roughly linear. Such variation of hydraulic regime suggests fracture closure [see, Wright et al., 1996; Upchurch, 2003].

To model the pressure decay and obtain $kw_{eff}$ one may assume a simplified model governing the fluid flow between the borehole and the fracture network. It may be assumed that the pressure decay is controlled by the borehole storage and the viscous flow of fluid in a fracture network that originates from the borehole perforations and penetrates the formation radially.

In particular, the fluid flow in the fracture network can be described by the radial Darcy's law:

$$\frac{\partial V}{\partial t} = \frac{2\pi \kappa w}{\ln\frac{R}{R_w}\eta}(P_0 - P_w(t)) \tag{1}$$

where V, κ, w, R, $R_w$, η, $P_0$ and $P_w$(t) are: the volume of fluid, permeability, fracture width (aperture), diffusion skin depth, borehole radius, viscosity, fluid pressure at distance R from the borehole ("domain radius") and borehole pressure, respectively. The product of κ and w gives $kw_{eff}$.

At the same time, the decay of pressure in the borehole, i.e., what is analyzed, is controlled by the borehole storage, which may be represented by the equation:

$$\frac{\partial P_w}{\partial t} = \frac{K}{V_w}\frac{\partial y}{\partial t} \tag{2}$$

where K and $V_w$ are an elastic modulus, which is function of the fluid bulk modulus and borehole stiffness, and the borehole volume, respectively. By rearranging eq. (2), and by equating eq. (1) and (2) one can write:

$$\frac{\partial P_w}{\partial t} = C_0(P_0 - P_w(t)) \tag{3}$$

where $C_0$ is assumed to be constant and equal to:

$$C_0 = \frac{2\pi \kappa w_{eff} K}{\ln R/R_w \eta V_w} \tag{4}$$

For $P_w$(t=0)=$P_i$ the solution of eq. (3) is:

$$P(t) = P_0 + (P_i - P_0)e^{-C_0 t} \tag{5}$$

Data may be fit, for example, by means of a non-linear least squares method assuming R=98.43 ft, K=145 ksi and η=1 cP. $R_w$ and $V_w$ are calculated according to the borehole dimensions and stage depth. To properly fit the pressure decline, including the linear decay, a first-degree polynomial function was added to eq. (5). Thus, the fitting function becomes:

$$P(t) = P_0 + (P_i - P_0)e^{-C_0 t} + mt \tag{6}$$

Figure 15:
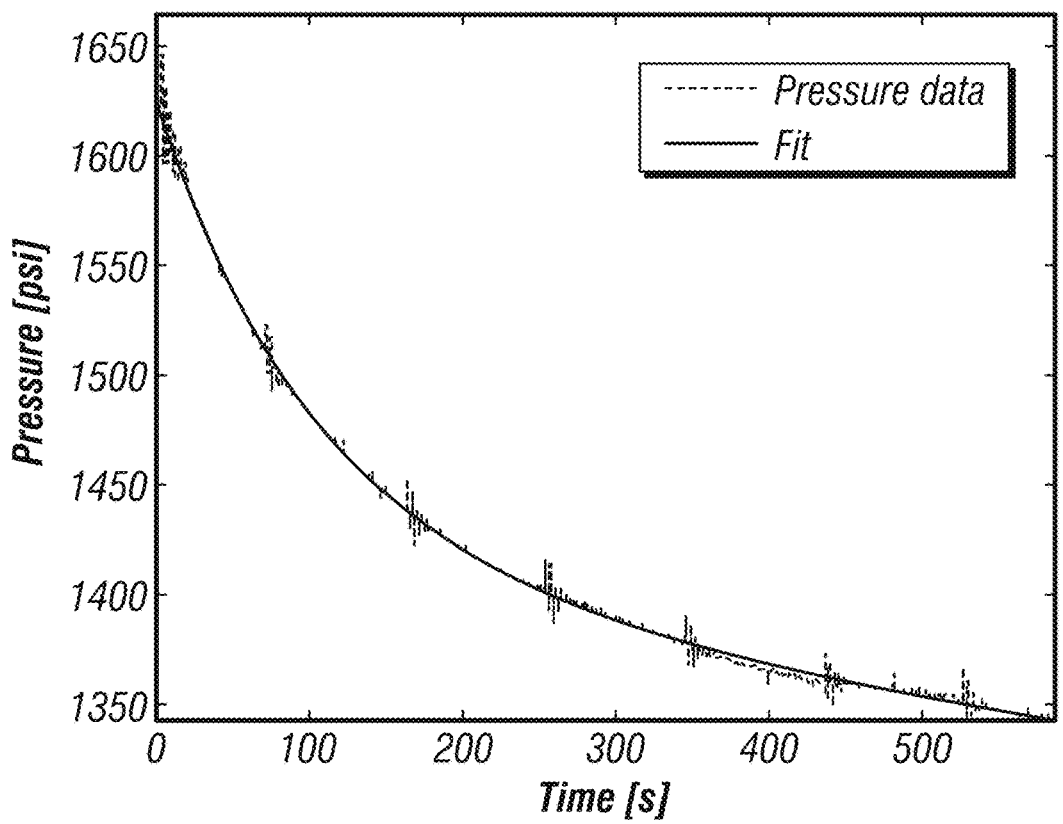
FIG. 15 shows the inset region 1401 with a thick line (1502) of a curve fit over the thin line of the raw data. Good fit indicates accurate model inversion to conductivity.

The above fitting procedure estimates $P_0$, $C_0$ and m. Consequently, $kw_{eff}$ may be estimated by means of eq. (4). FIG. 15 shows an example of data fitting. This $kw_{eff}$ may then be compared to conductivity acquired using other methods.

Figure 16:
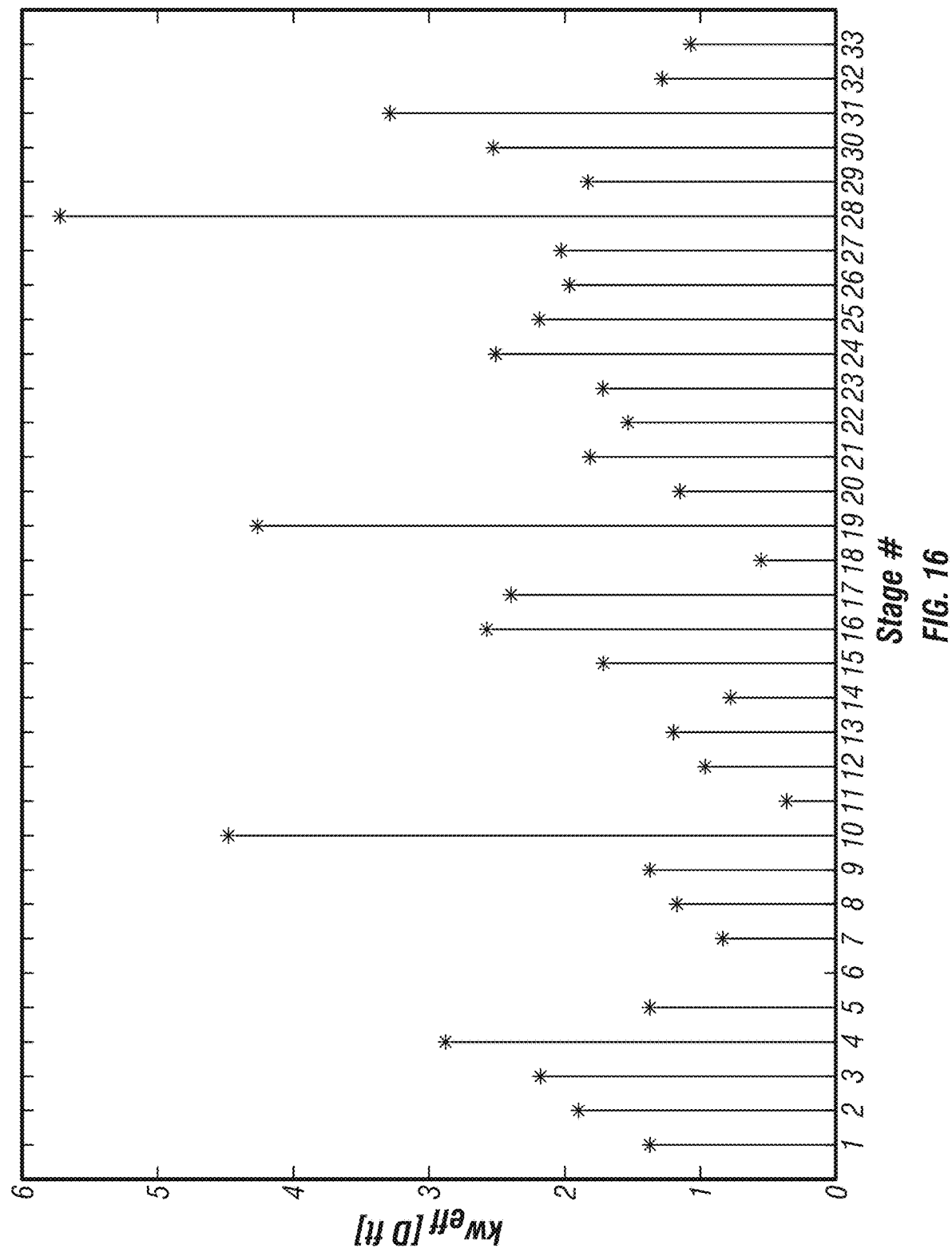
FIG. 16 shows effective conductivity in far-field region, $kw_{eff}$ computed for a multitude of stages on a well.
Figure 17:
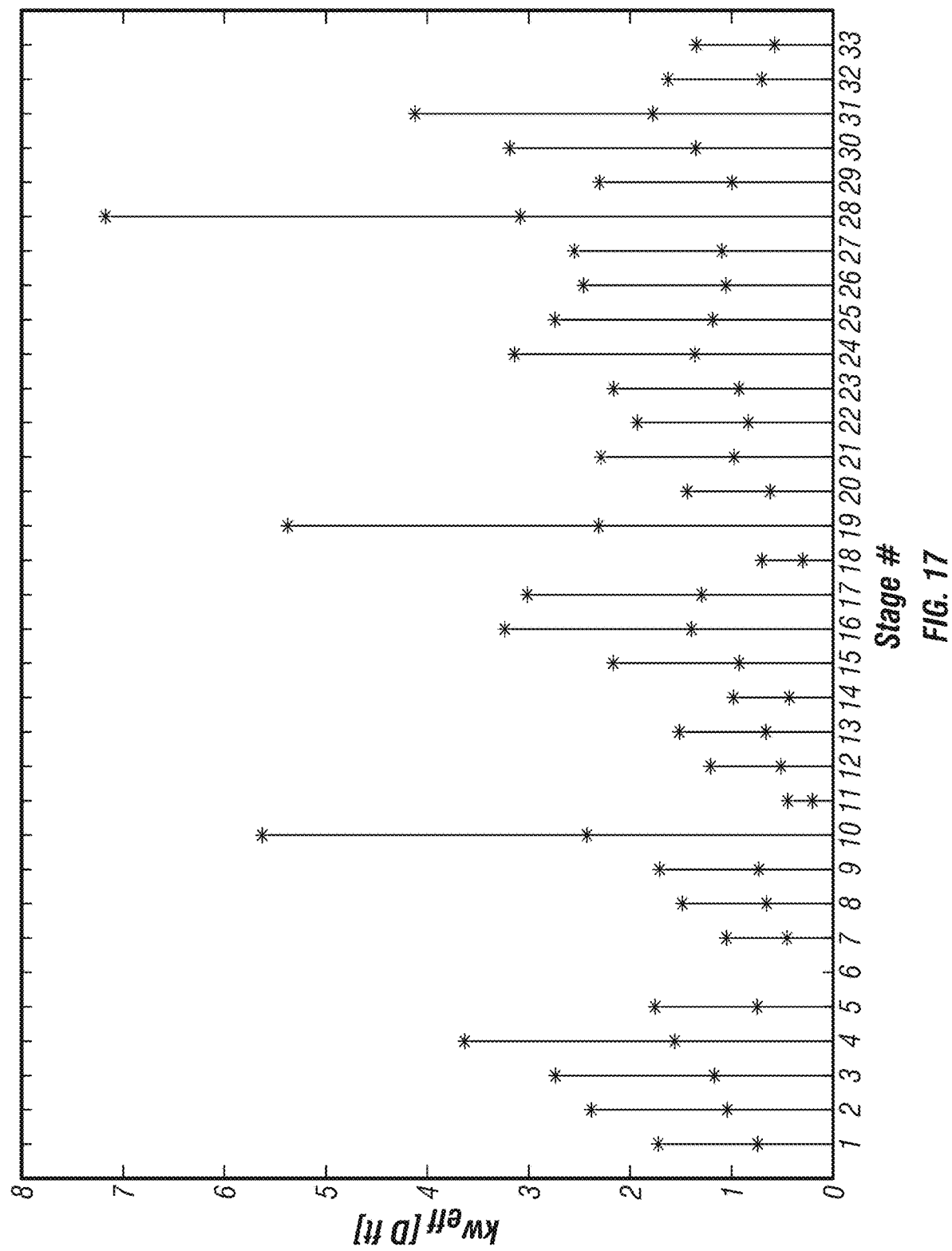
FIG. 17 shows effective conductivity in the far field region ($kw_{eff}$), computed using two parameters for domain radius R (domain radius fracture length), and portrays a range of R or fracture length between R=5 . . . 500 ft (upper and lower stars respectively). Note that the same borehole as FIG. 16 is used.

FIG. 16 shows the $kw_{eff}$ values for each stage of a borehole given a single domain radius, R=500 ft. Data recording for stage 6 was interrupted, making pressure-decay analysis for this stage impossible. FIG. 17 uses R=500 ft and R=5 ft and plots these results together to provide upper and lower bounds on the far-field conductivity measurement.

7. Fracture Conductivity from Reflectivity (Reflectivity Method): Overview

Figure 18:
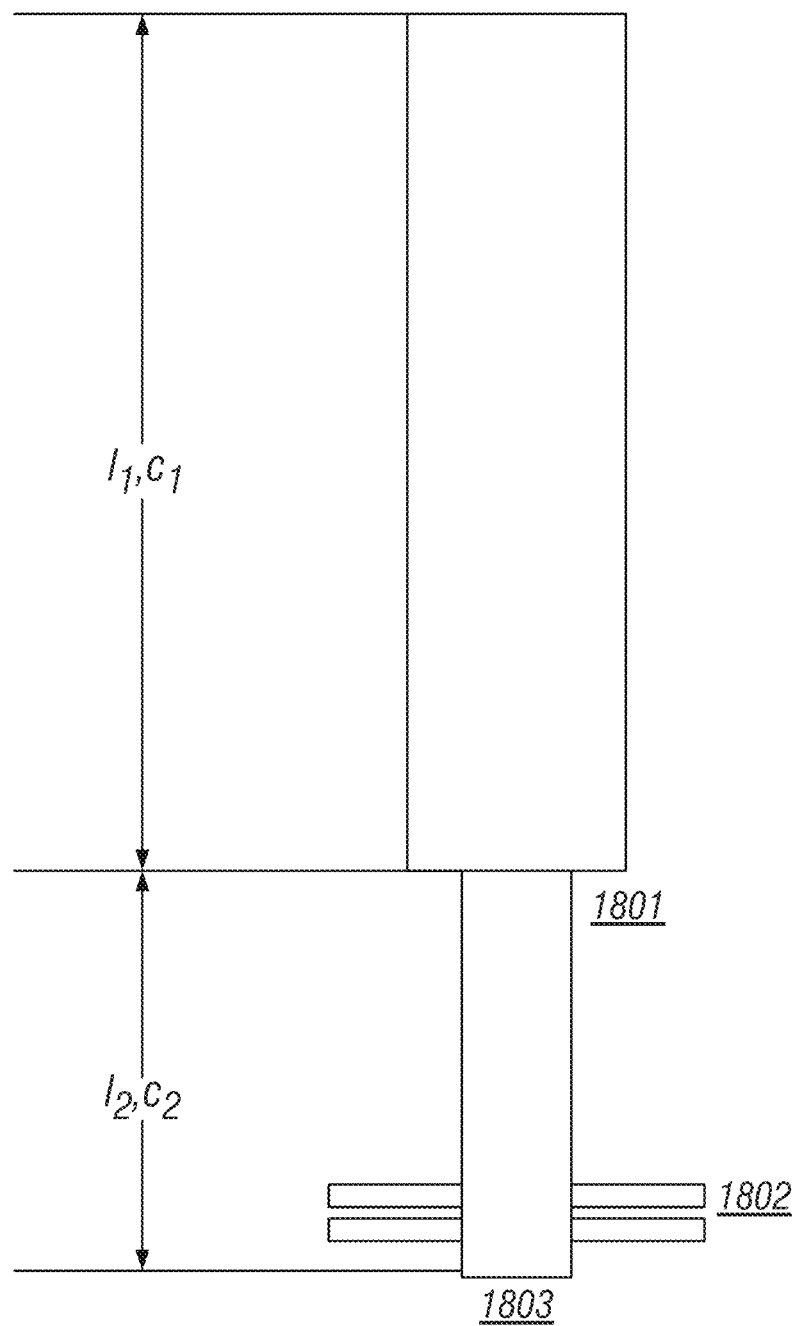
FIG. 18 shows the sketch of quantities and model used for the inversion of the far field diffusion conductivity analysis. Here, $l_1$, $l_2$ and $c_1$, $c_2$, are the intermediate/surface and production casing lengths and tube wave speeds respectively. A vertical borehole is depicted as an example. Analysis would be the same for a deviated borehole. A casing joint 1801, perforations and fracture network 1802, and plug for a stage 1803 are depicted.

A known method uses tube wave reflections from hydraulic fractures to determine fracture properties. Tube wave data are recorded continuously, including times when the pressure source is pulsed ("active source data") and other times when pump noise and other wave sources are continuously generating tube waves. This section provides an overview of how active source data may be processed, analyzed, and interpreted. The active source data comprise pressure waves (tube waves) that are generated at the wellhead, travel down the borehole, reflect off of the set of fractures in the current stage, and return to the wellhead where they are detected and recorded. (FIG. 18 depicts schematically some of the wave reflections 1802, 1803; also shown in FIG. 1 at 108-110.)

The detected pressure data may be interpreted using a model that accounts for Darcy flow within the proppant-filled fractures, elastic compliance of the fractures, and coupling between the fractures and borehole, ultimately yielding a complex-valued, frequency-dependent reflection coefficient or reflectivity. Comparisons between the model and data are made in both the time domain (i.e., full waveform inversion) and frequency domain (i.e., matching frequencies and quality factors of resonant modes of the borehole-fracture system). With additional assumptions, described below, the reflectivity can be used to infer the hydraulic conductivity of the fractures (i.e., the product of fracture aperture and permeability). The foregoing procedure provides a means to efficiently monitor fracture properties during and after stimulation treatments.

Tube Waves and Reflectivity

Tube waves are pressure waves propagating within a fluid-filled borehole that have velocities on the order of 5000 ft/s. In addition to changing pressure, p [psi], tube waves in a flowing fluid also change the local flow rate, q [in barrels per minute–bbpm] within the borehole. The ratio of pressure change to change in flow rate is known as the hydraulic impedance, Z [psi/bbpm]. Hydraulic impedance can be defined for tube waves within the borehole, as well as for hydraulic fractures (for which pressure changes are governed by a diffusion-type equation rather than a wave equation, details to follow).

Figure 19:
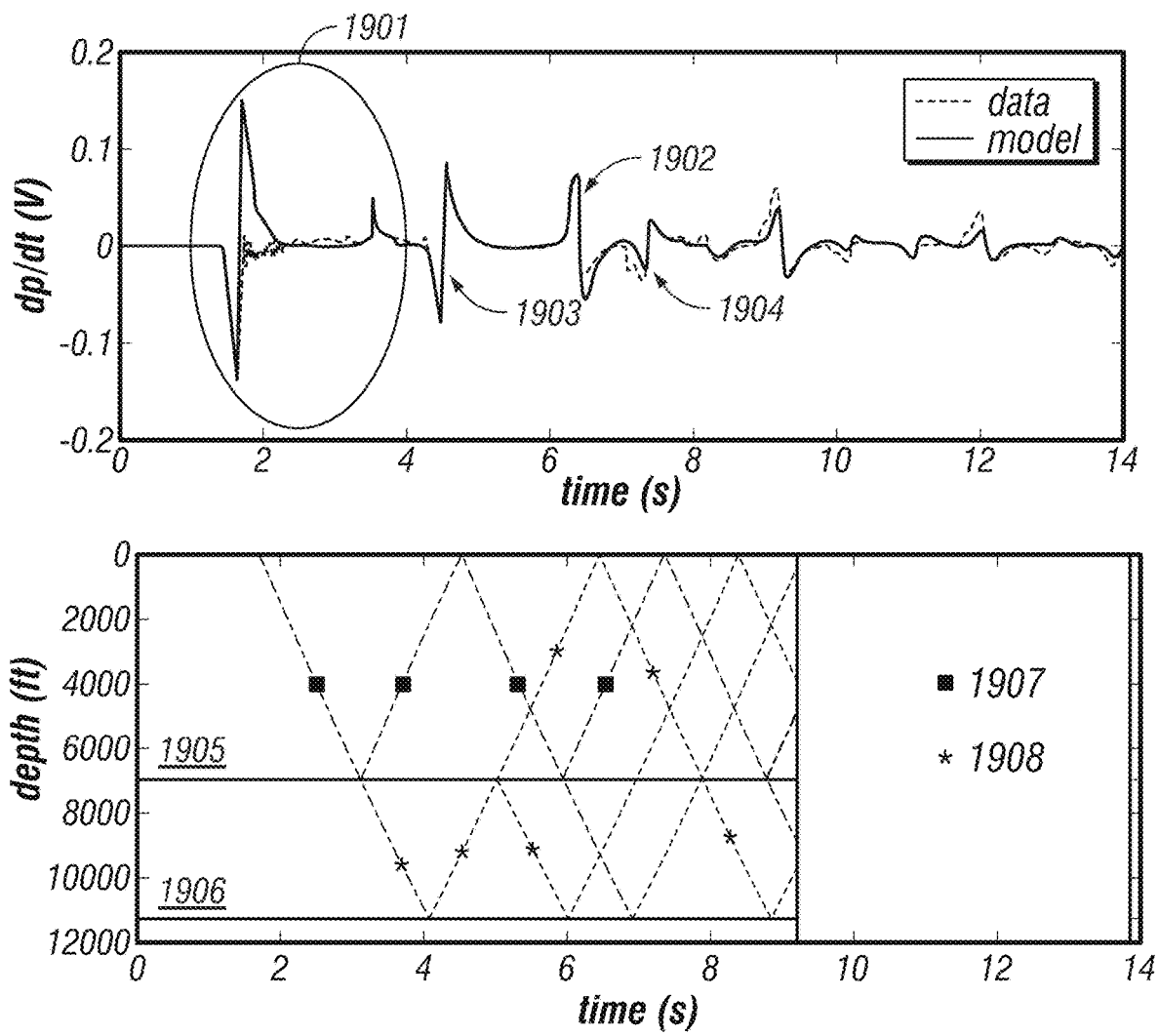
FIG. 19 shows data (lighter shade) and model (darker line) of an active pulse. In the top graph, a source waveform 1901 is circled, followed by first fracture reflection, 1902, first casing reflection, 1903, and second casing reflection, 1904. In the bottom graph, corresponding reflections are mapped with lines reflecting either off a casing change, 1905, at about 6500 ft, or from fractures at about 11500 ft. Paths without fractures, 1907, are marked by a square, while paths having at least one interaction with a fracture, 1908, are marked with a star. Note that not all the paths are shown in this diagram.

Tube waves can be generated by modulations in flow rate at the wellhead. This happens when pumps are abruptly turned on or off, in which case the tube wave response is commonly termed water hammer. The acoustic or seismic pulse source as shown in FIG. 19 at 1901, may generate tube waves by modulating wellhead flow rate (essentially displacing or taking in a small volume of borehole fluid) in a controlled manner and is designed to produce coherent signals in the 0.1 to 10 Hz frequency band.

Tube waves can reflect from discontinuities in the borehole cross-sectional area, such as changes in the casing diameter. Tube waves also reflect from the set of hydraulic fractures and plug at the bottom of the borehole. See e.g., FIGS. 18 and 19. At lower frequencies, tube wave wavelengths are longer than the separation between individual perforation clusters, so tube waves reflect from the collective set of hydraulic fractures and the plug at the end of a stage, rather than from any individual fracture or perforation.

The reflection coefficient, or reflectivity R, depends on the ratio of hydraulic impedances. As a simple example, consider a borehole with two sections that have different casing inner diameters. Let $S_1$ be the cross-sectional area of the borehole in the upper section, containing the incident and reflected tube waves, and let $S_2$ be the cross-sectional area in the lower section, containing the transmitted tube wave. The reflectivity at the casing change is $R=(Z_2-Z_1)/(Z_2+Z_1)$, where $Z_1$ and $Z_2$ are the hydraulic impedances in the upper and lower sections, respectively. The hydraulic impedance of a tube wave is $Z=\rho c/S$, where $\rho$ is the fluid density, c is the tube wave velocity, and S is the cross-sectional area.

As a second example, consider a borehole with constant cross-sectional area (and hence hydraulic impedance, denoted by ZT) that terminates in a set of hydraulic fractures and plug. Let $Z_f$ be the hydraulic impedance of the set of fractures and plug. The reflectivity from the fractures and plug is $R=(Zf-ZT)/(Zf+ZT)$. In contrast to the example of the casing diameter change, for which the hydraulic impedances were simply constants, the fracture hydraulic impedance and hence reflectivity depend on frequency. Details of the frequency-dependent hydraulic impedance of fractures can be found in Dunham et al., 2017 SEG extended abstract (Dunham et al., 2017).

Two extreme cases can be defined. The "closed-end" limit corresponds to $Zf \gg ZT$, meaning that the fractures and plug offer more resistance to flow than the borehole. The borehole is effectively terminated with a closed-end (zero flow rate) condition and the reflectivity is $R=1$. The "open-end" limit corresponds to $Zf \ll ZT$, meaning that the borehole offers more resistance to flow than the fractures. Because it is so easy for fluids to flow into the fractures, pressure at the bottom of the borehole is as a practical matter held constant. In this limit, the reflectivity is $R=-1$. In practice, hydraulic fractures lead to reflectivity values somewhere between these two limits, though a transition from more closed-end conditions to more open-end conditions is observed to accompany stimulation treatments.

Finally, the above concepts can be generalized to more complex, and realistic, situations such as boreholes that have both casing changes along their length as well as hydraulic fractures. In addition, it is essential to account for attenuation of tube waves. This introduces an additional parameter to the tube wave model, the dimensionless borehole quality factor Q. High values of Q correspond to lower attenuation.

Fracture Hydraulic Impedance and Parameter Choices

The hydraulic impedance of a fracture filled with proppant and viscous fluid depends on several quantities. This section describes these quantities in more detail, and discusses which fracture properties can be determined (either uniquely or with independent constraints on other properties) from tube wave reflectivity.

Results shown in this disclosure utilize the fracture model presented in Dunham et al. (2017). The pressure perturbation within the fractures, p, obeys a diffusion equation. The diffusion equation comes from conservation of fluid mass; compressibility of the fluid, proppant pack, and fracture compliance; and Darcy's law. At a given frequency, the amplitude of the pressure perturbation decays exponentially with distance into the fracture. The characteristic depth of penetration is known as the diffusion length or skin depth, and varies between a few inches for highly viscous fluids and low fracture permeability to possibly more than ten feet for low viscosity fluid and high fracture permeability. The fracture properties reported here are average values over these distances. Quantitative estimates of skin depth are provided below, after describing the model in more detail.

The hydraulic impedance of a single hydraulic fracture is:

$$Z_0(\omega) = \sqrt{\frac{\mu}{-i\omega\varphi\beta kA^2}},$$

where $\mu$ is the fluid viscosity; $\varphi$ is the porosity; $\beta$ is the sum of fluid compressibility, pore compressibility, and fracture compliance; k is the fracture permeability; A is fracture cross-sectional area, and $\omega$ is the angular frequency ($\omega=2\pi f$, where f is the frequency). A set of N two-sided (bi-wing) hydraulic fractures, all with identical properties, and an impermeable plug has total hydraulic impedance $Z_f=Z_0/2N$. Throughout this disclosure, it is assumed that the total number of fractures is equal to the number of perforation clusters. That is, set $N=5$. From the previous discussion of fracture impedance, it follows that a reflectivity-based analysis can only uniquely determine the combined parameter:

$$\gamma = \frac{\varphi\beta kA^2}{\mu},$$

and that independent constraints (or guesses) for individual parameters are required in order to determine the remaining parameters. In fact, if the number of fractures N is not assumed, then the parameter that can be determined uniquely is $N^2\gamma$.

In this disclosure it is assumed that the compressibility/compliance parameter is dominated by the fracture compliance, such that:

$$\beta = \frac{H}{w}\frac{1-v}{G},$$

where H and w are the fracture height and width (or aperture), respectively, and G and v are the shear modulus and Poisson ratio of the formation, respectively. It is furthermore assumed that the fracture cross-section is elliptical, such that $A=\pi Hw/4$. It follows that $$\gamma = \frac{\pi^2}{16}\frac{\varphi(1-v)H^3}{G\mu}kw.$$

Two levels of analysis are provided in this disclosure. The first level provides minimal interpretation (i.e., as few assumptions as possible) and reports the combined parameter $\gamma$ The second level utilizes generic estimates for the parameters in the second fraction ($\phi=1$, $\eta=0.26$, $G=1.45$ kpsi, $H=32.8$ ft, and $\mu=1$ cp) in order to infer the fracture conductivity kw. Of course, these parameter estimates might be inappropriate (e.g., when gel is used instead of slickwater, where viscosity would be much higher or shear-rate dependent) and the resulting values of conductivity kw should then be adjusted or compared more as relative to each other.

Conductivity From Wave Reflection Theory

The frequency domain resonance frequency/Q data of the tube wave response has been fitted into a coupled two-layer borehole-fracture model using a genetic algorithm global minimization based inversion approach.

The inversion is intended to obtain five parameters: kw (fracture conductivity), Q1 (upper part borehole Q factor), Q2 (lower part borehole Q factor), $c_1$ (1802, upper part borehole wave velocity) and $c_2$ (1803, lower part borehole wave velocity).

Tube wave traces could help in estimating frequency dependent fracture hydraulic impedance through time domain full waveform inversion (Dunham et al., 2017), however the time domain L2 norm misfit may not work under low Q conditions which is this case. The multiple reverberations of tube waves could introduce several arrivals due to:
1. frequency dependent fracture hydraulic impedance
2. casing diameter change
3. tube wave velocity and Q variations of the borehole and
4. source signature influence.

The misfit function required to isolate item 1 above from other remaining factors is required to invert the fracture conductivity kw.

Full Waveform Inversion Methodology

The source and receivers (hydrophones and pressure transducers) are located at the wellhead in the example embodiment shown in FIG. 1. This section describes how recorded data are processed and analyzed in order to constrain fracture properties. Generally speaking, the procedure is as follows: Data are filtered to eliminate high frequency noise. The source waveform is identified. The waveforms in the time domain, or spectra in the frequency domain, are fit to a model that accounts for the variable cross-sectional area of the borehole (e.g., casing changes), borehole fluid properties, and fracture properties. Model parameters, such as the fracture conductivity, are varied so as to minimize the misfit between the modeled time series or spectrum and the data. Details of the analysis are provided below, in the context of actual data from an actual borehole and stage 9 of its hydraulic fracturing treatment.

The hydrophone time series in FIG. 19 shows the direct source waveform (1-4 s) followed by multiple reflections 1902-1904, and corresponding 1907, 1908. These reflections come from changes in borehole cross-sectional area, casing joint 1905, and from the fractures at the end of the stage, 1906. The hydrophone data are reported in volts (V), but constitute a measurement of the rate of change of pressure (i.e., dp/dt). The data have been low-pass filtered below 20 Hz.

Below, the hydrophone time series is a space-time diagram showing paths taken by different wave arrivals, as well as depths of the casing diameter change (obtained from the borehole diagram) and the fractures and plug. The first wave arrival corresponds to a reflection from the casing change. The second arrival is the wave that transmits through the casing change, propagates down to the fractures and reflects from them, and transmits again through the casing change before arriving at the wellhead. Later arrivals correspond to more complex paths involving multiple reflections in the upper and/or lower borehole sections and in between.

The casing diameter information provided in the borehole diagram is used to constrain the reflectivity associated with the casing change at about 7000 ft. The tube wave velocities in the upper and lower borehole sections are determined by travel times of the different arrivals. Waveform cross-correlation can be used to improve accuracy.

The source waveform is obtained from the data. The direct source waveform measured on the hydrophone in this case does not provide an accurate measurement of the tube wave source, possibly due to electrical noise. Therefore, the first casing reflection is used to determine the source waveform. It is necessary to correct for amplitude reduction due to reflection from the casing change, as well as attenuation in the upper borehole section. The source waveform is obtained using the adjoint for the forward modeling operator in the upper borehole section; it is shown in the "model" time series around 1-4 s. Note that the source waveform consists of a sequence of pulses, corresponding to various motions of a source piston (an initial forward motion, lasting less than a second, followed by a more gradual backward motion that initiates about two seconds later).

Once the source waveform is determined, then the forward modeling operator is used to obtain the complete time series. The waveform misfit is then quantified, for example using an L2 norm, and then minimized by varying several model parameters. These parameters include the borehole quality factor Q (in both upper and lower borehole sections) and the combined parameter □. Recall that with assumptions regarding other parameters, the combined parameter □ can be used to infer the fracture conductivity kw. The data can also be fit in the frequency domain, and in practice a misfit functional that combines time-domain and frequency-domain properties is used.

Figure 20:
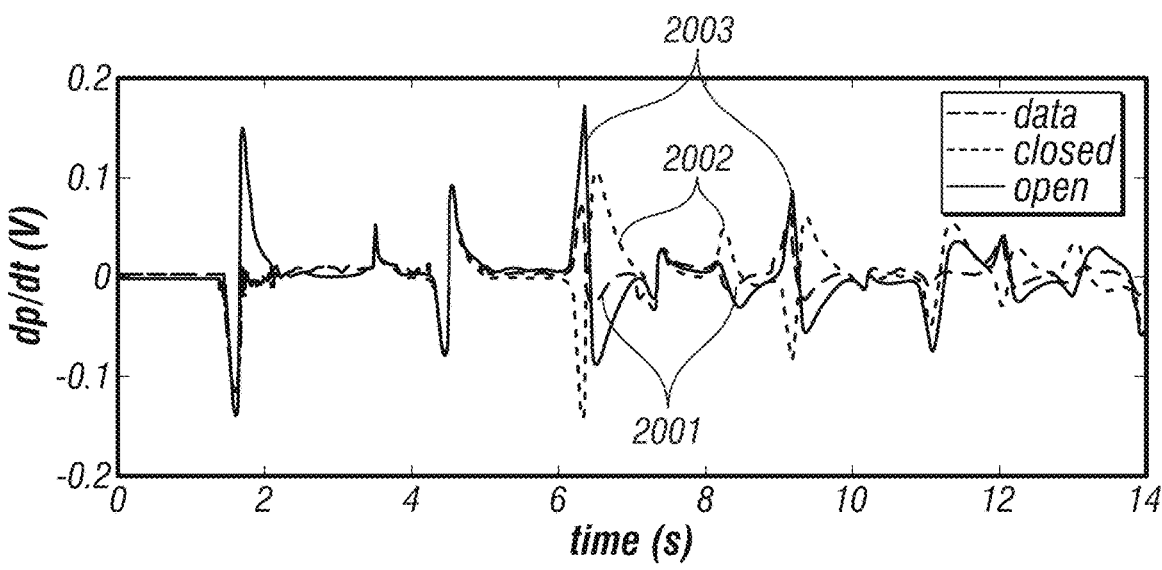
FIG. 20 shows how data, darkest gray, 2001 looks when overlain with closed, 2002, or open, 2003, boundary condition. The data 2001 is not consistent with either limit, thus fractures result in a partially open boundary condition.

To illustrate the sensitivity of the data, 2002, to fracture properties, two examples are shown in FIG. 20 using fully open, 2003, and fully closed, 2002, end conditions instead of the best-fitting fracture properties. The waveform fit is severely diminished.

Sensitivity to Conductivity and Estimates of Skin Depth

This section of the present disclosure provides additional details on the use of reflectivity measurements to infer fracture conductivity. It also provides estimates of the skin depth, the distance into the formation over which the fracture conductivity can be inferred with example embodiments of methods as disclosed herein.

Figure 21:
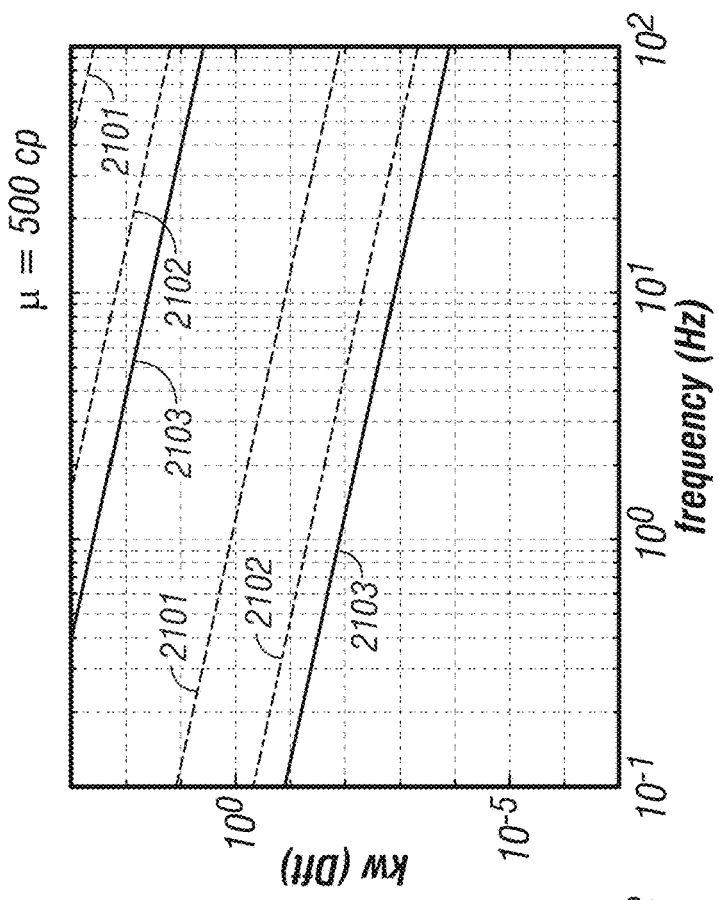
FIG. 21 shows an example of an upper and lower bounds on sensitivity set by a reflection coefficient |R|=0.9 for 2 cases. Slickwater, with viscosity $\mu$=5 cp on the left and crosslinked gel with viscosity $\mu$=500 cp on the right. Different lines show the number of fractures as 1, 5, and 10 labeled 2101, 2102, and 2103 respectively. For each line, the upper curve marks the upper limit of sensitivity, above which the reflectivity is essentially the same as a fully open end; the lower curve marks the lower limit of sensitivity, below which the reflectivity is essentially the same as a fully closed end. Values of kw between the two curves can be accurately inferred from reflectivity.
Figure 21:
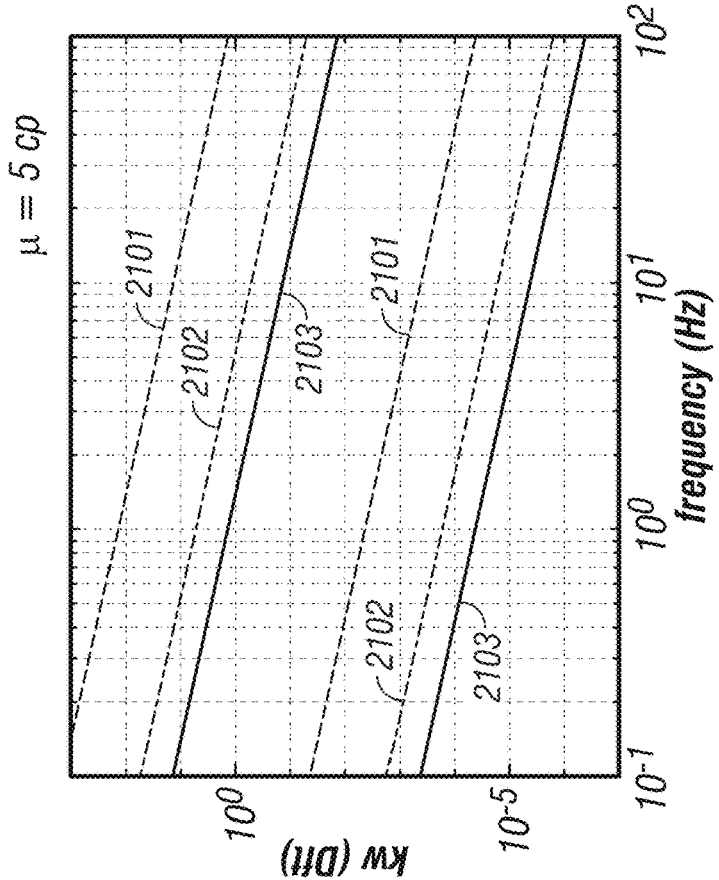

As explained in the previous section, the reflectivity R varies between +1 in the fully closed end limit and −1 in the fully open end limit. Only when R is appreciably different from these limits is there sensitivity to conductivity, kw. Therefore, we quantify the range of kw for which |R|<0.9 (a somewhat arbitrarily chosen threshold). Values of kw outside this range of sensitivity produce waveforms consistent with either fully closed or fully open end conditions, and there is no ability to infer kw beyond bounding it. FIG. 21 shows this sensitivity analysis for two end-member cases, slickwater left (viscosity of 5 cp) and crosslinked gel right (viscosity of 500 cp). In both cases, there is sensitivity to values of kw of order 1-10 D ft, which are representative of post-fracture treatment values obtained by the present embodiment of analysis. The number of fractures is 1, 5, and 10, as shown in curves 2101, 2102, and 2103 respectively.

Figure 22:
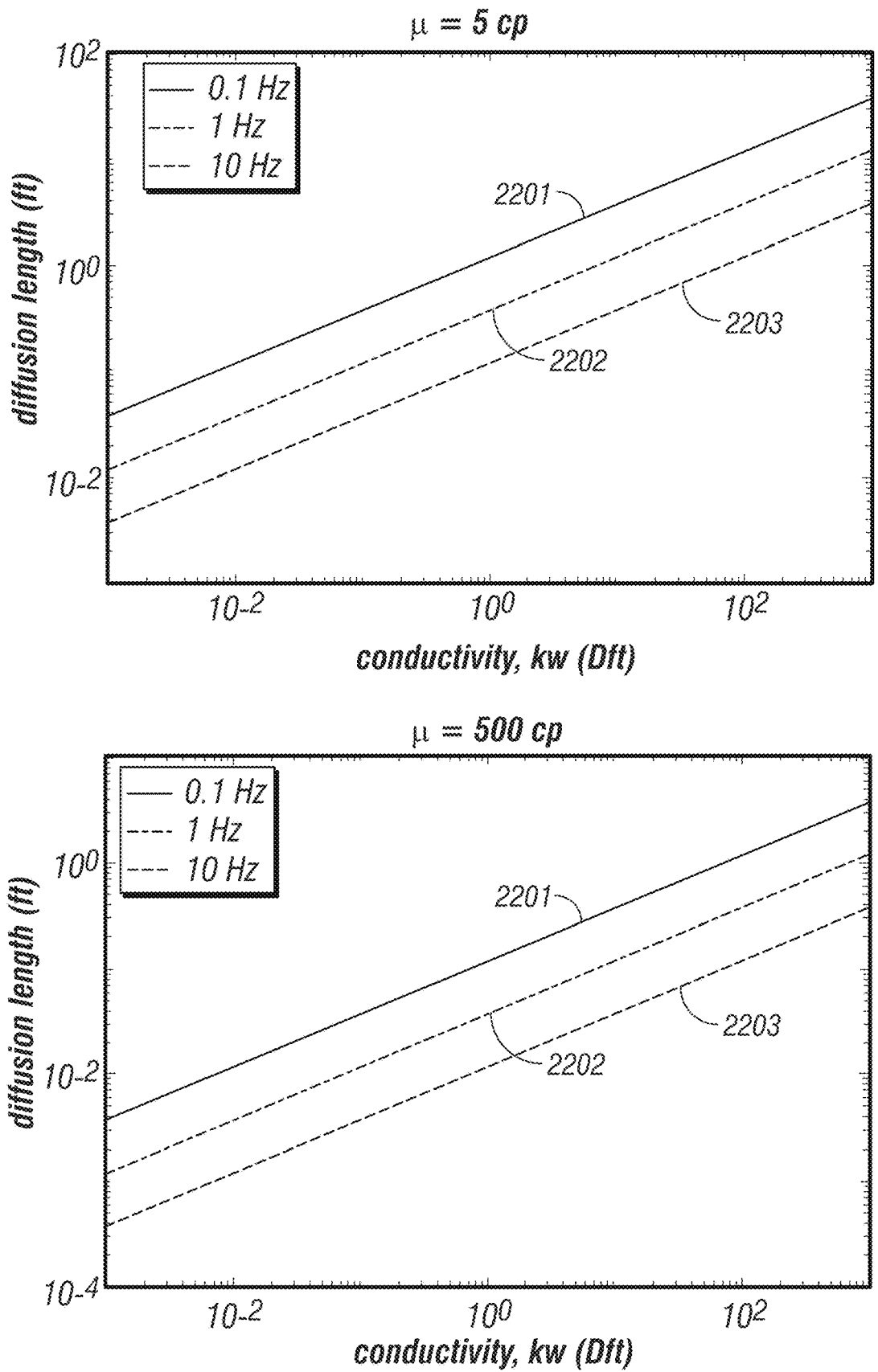
FIG. 22 shows example sensitivity in different fluids (slickwater on top and crosslinked gel on the bottom) for different frequencies 0.1, 1, and 10 Hz labeled as 2201, 2202, and 2203 respectively. The graph shows skin depth, or diffusion length as a function of conductivity at different frequencies. The skin depth measures the depth extent over which fracture properties can be inferred.

Next the skin depth of the measurement is examined. As described earlier, pressure within the fractures obeys a diffusion equation and, at a given frequency, the pressure perturbation decays exponentially with distance from the borehole. FIG. 21 shows a function of conductivity kw. The skin depth is largest for low viscosity fluids like slickwater and crosslinked gel at different frequencies, as FIG. 22 shows the skin depth for slickwater (top) and crosslinked gel (bottom). The frequency range is 0.1, 1, and 10 Hz, as shown in curves 2201, 2202, and 2203 respectively.

8. Conductivity Analysis Between Stages

Figure 26:
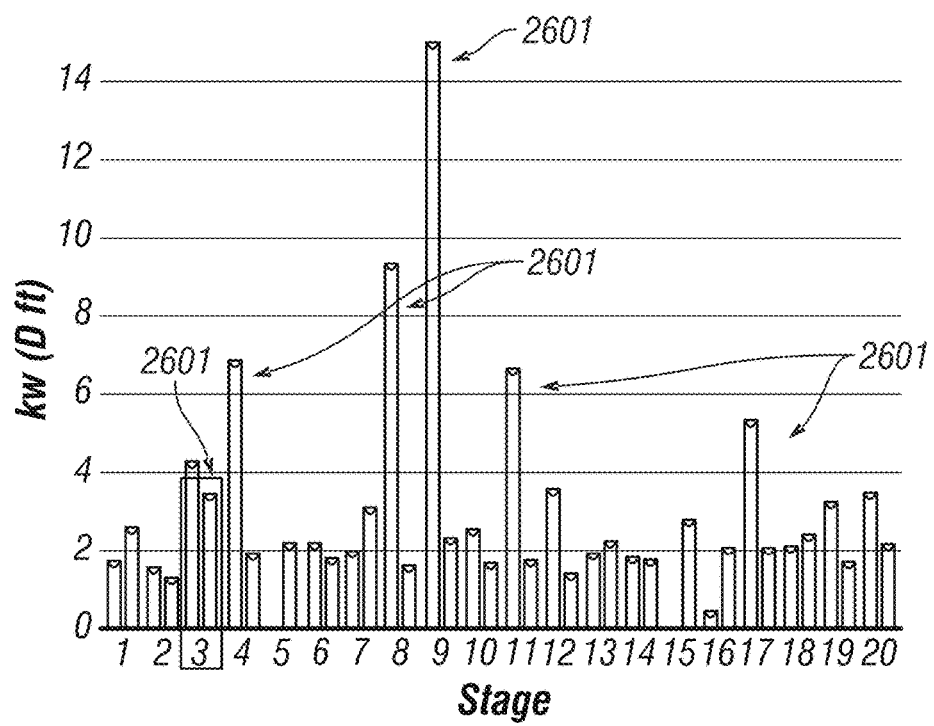
FIG. 26 shows conductivity per stage as measured by a pulse approximately 10 minutes after shut-in. The values are computed using two different approaches—diffusion and reflectivity in lighter and darker gray respectively. Stage 3, 2601, exhibits above average conductivity using both approaches. Stages 4, 8, 9, 11, and 17 show high near-borehole conductivity using the reflectivity approach.

As an example, the two above described methods were used to compute conductivity as presented in FIG. 26. The first is the Reflectivity (Diffusion) Model method, and the second is the Pressure Decay method.

FIG. 26 presents the fracture network conductivity measured 10 minutes after shut-in by the Pressure Decay and Diffusion Model methodologies. Five stages (4, 8, 9, 11 and 17) exhibit a significantly higher conductivity using the Diffusion Model process than the other stages. Stage 3 is observed to have high measured conductivity using both the Diffusion Model method and the Pressure Decay method.

Two possible explanations exist for the high near-borehole conductivity values measured in fracture treatment stages 4, 8, 9, 11 and 17. The first is that near-borehole proppant was flushed from the fractures, but the active pulses were conducted before the fractures had time to completely close, resulting in the high measured conductivity of an open fracture with no proppant to impede diffusion. The other possible scenario is that these stages have wide fractures at the perforations, and have excellent, propped, near-borehole conductivity. In this latter case, one would expect these stages to contribute more than other stages to initial production.

9. Resonant Mode Frequency Mapping (RMFM)

Changes in the frequency of the resonance modes of the borehole system provide additional information about the overall fracture network, and state of the borehole (including its bottom) in general. In this section, the resonant frequency of the $3^{rd}$ mode of the systems is presented alongside the pumping data for each stage, and some areas of interest are highlighted and discussed. One way to display resonances was already presented in FIGS. 2-4 as K-graph showing multiple resonances within a certain frequency range.

Figure 27:
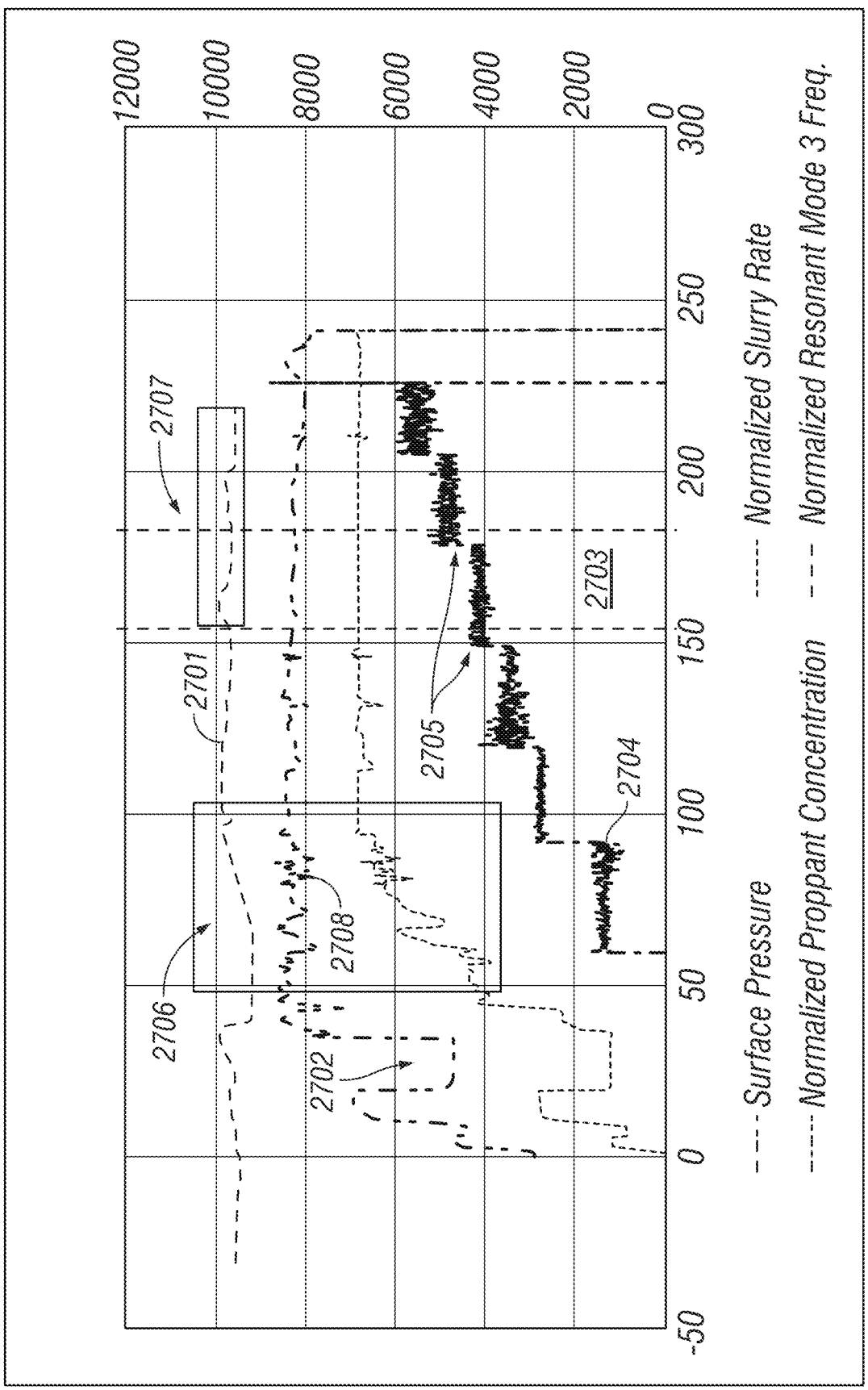
FIG. 27 shows an exemplary stage pumping data overlaid below a resonant frequency, 2701, tracked throughout the stage. Note, only pressure—2 time series in the middle, 2702,—is to scale. The resonant frequency (top line, 2701), is independent of surface pressure but rather varies with pumping rate, and/or density, as highlighted in square 2706. Dashed lines, 2703, indicate where resonant frequency 2701 increases when proppant reaches fractures, 2707. The difference between the proppant increase at surface, time series 2704, and the increase in frequency is approximately 4 minutes, corresponding approximately to the volume of the borehole at the rate. 2708 is normalized slurry rate.

FIG. 27 is an example of a Resonant Mode Frequency Mapping plot; in this case, for fracture treatment stage 3. Note that a comparable analysis can be made for any mode or frequency peak of interest. With the exception of pressure, the curves are not to scale, and are offset for clarity of the illustration. In FIG. 27, two regions of frequency change in response to proppant density increase are marked. There is approximately a four minute delay in frequency change after the proppant density is increased. An initial increase in resonant mode frequency may be observed. This increase in resonant mode frequency is followed by a short plateau, and then a gradual decline in the resonant mode frequency to approximately the value before the proppant density increase. This gradual drop in resonant mode frequency may correspond to the proppant entering the fracture network, thereby effectively increasing the length of the resonant system. For such mechanism of change in the resonant mode frequency, the rate of frequency decline is related to the rate of proppant uptake within the fracture network.

One can observe that the resonant mode frequency is not largely dependent on pressure. Rather, the resonant mode frequency changes as a function of rate and/or proppant density. As previously explained, a delay of approximately four minutes is observed for the frequency to change when proppant concentration is changed on the surface. This delay may be attributed to the time it takes for proppant to start consolidating in the borehole or reaching a certain depth in the borehole.

After the initial increase, the resonant mode frequency plateaus for a period of several minutes before gradually decreasing to approximately the previous value before the proppant density change. The initial increase may be interpreted as the length of the resonant system effectively shortening due to proppant accumulation near the perforations. As proppant gradually enters the fracture network the length of the resonant system increases. In real-time, this information can potentially be used to observe proppant or diverter uptake within the fracture network, and may be able to predict events such as tip screenout (screenout of fracture outermost, growing points, or "tips") before a pressure response is observed. Post-fracture treatment, the slope (rate) of the resonant mode frequency decline may be used to determine how far the increased proppant density has advanced into the fractures with respect to time.

10. K-Graph and Power Spectrum Analysis

Figure 28:
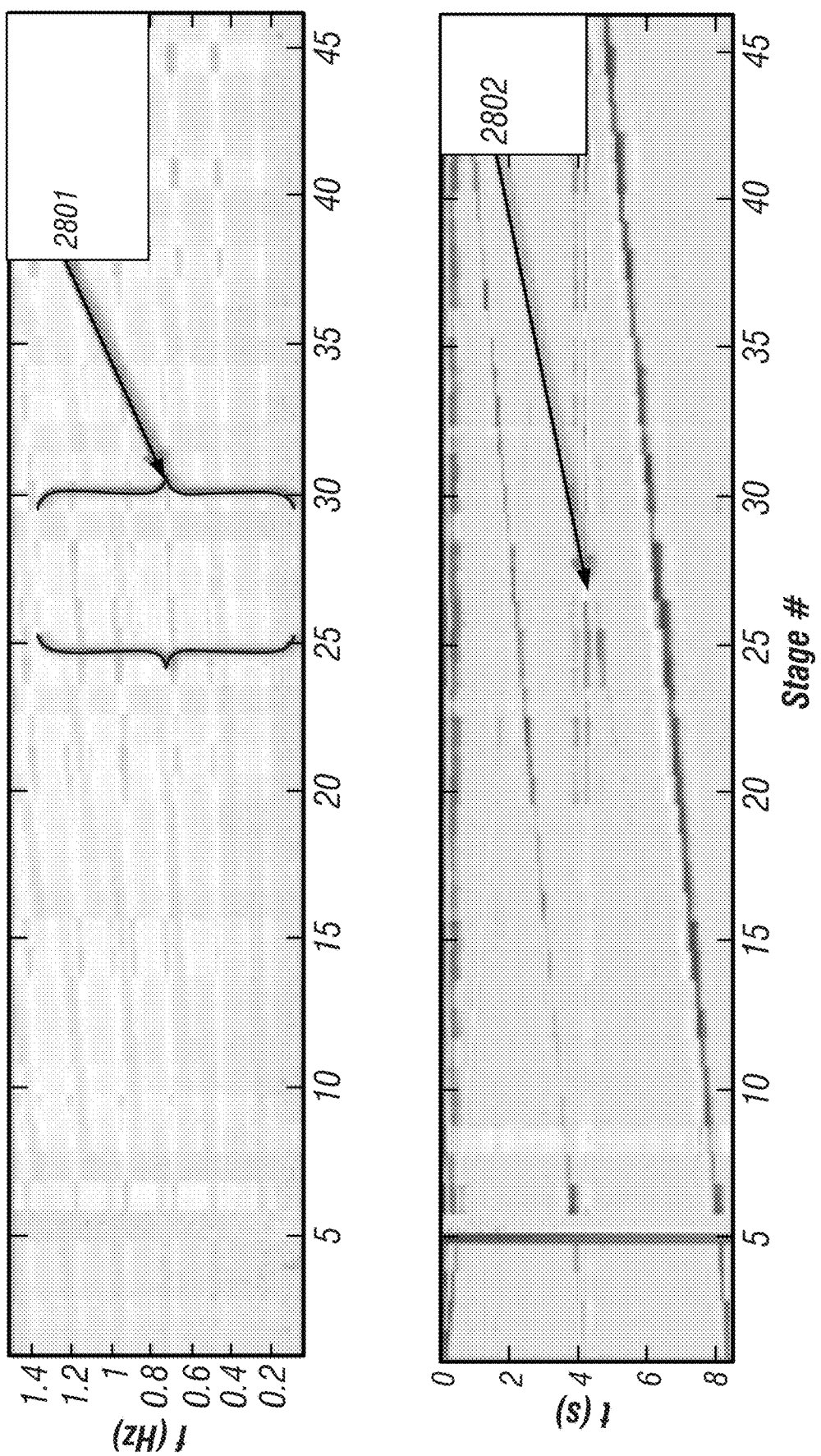
FIG. 28 shows the power spectrum and autocorrelation graph compressed for all stages to highlight various features. The highlighted region in brackets { }, 2801, shows a variation in strength of the measured interactions. Stage 29 is weaker than the several preceding stages. The energy distribution between the modes varies depending on borehole condition and fracture network interaction. The intermediate casing reflection, 2802, remains constant across all stages.

FIG. 28 shows autocorrelated acoustic reflections K-Graph (e.g., FIGS. 2-4). and power spectrum across a number of hydraulically stimulated stages. The intermediate casing reflection arrival time remains approximately constant between stages, indicating that conditions in the upper section of the borehole are not varying significantly. Changes in this arrival time would appear in the event of a screenout, casing failure, or other significant change in this section of the borehole.

Energy distribution between modes, as shown in the top power spectrum plot in FIG. 28 should vary with respect to borehole condition and influence of the induced fracture network on the overall resonance of a particular mode.

Figure 29:
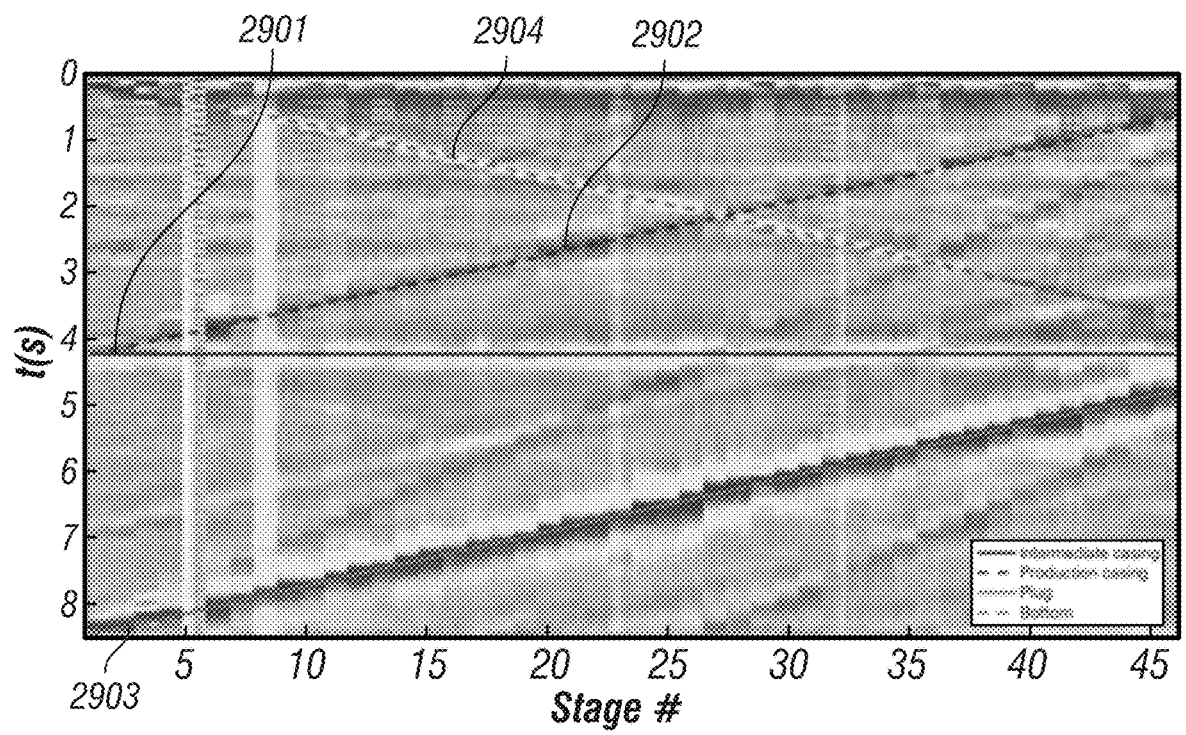
FIG. 29 shows a compressed autocorrelogram of many stages on a well. Major reflection features are highlighted by constant lines or trend lines. Constant reflection time is intermediate casing 2901. Times varying per stage are production casing to plug 2902, plug location 2903, and plug to borehole bottom 2904. Other features are also apparent.
Figure 30:
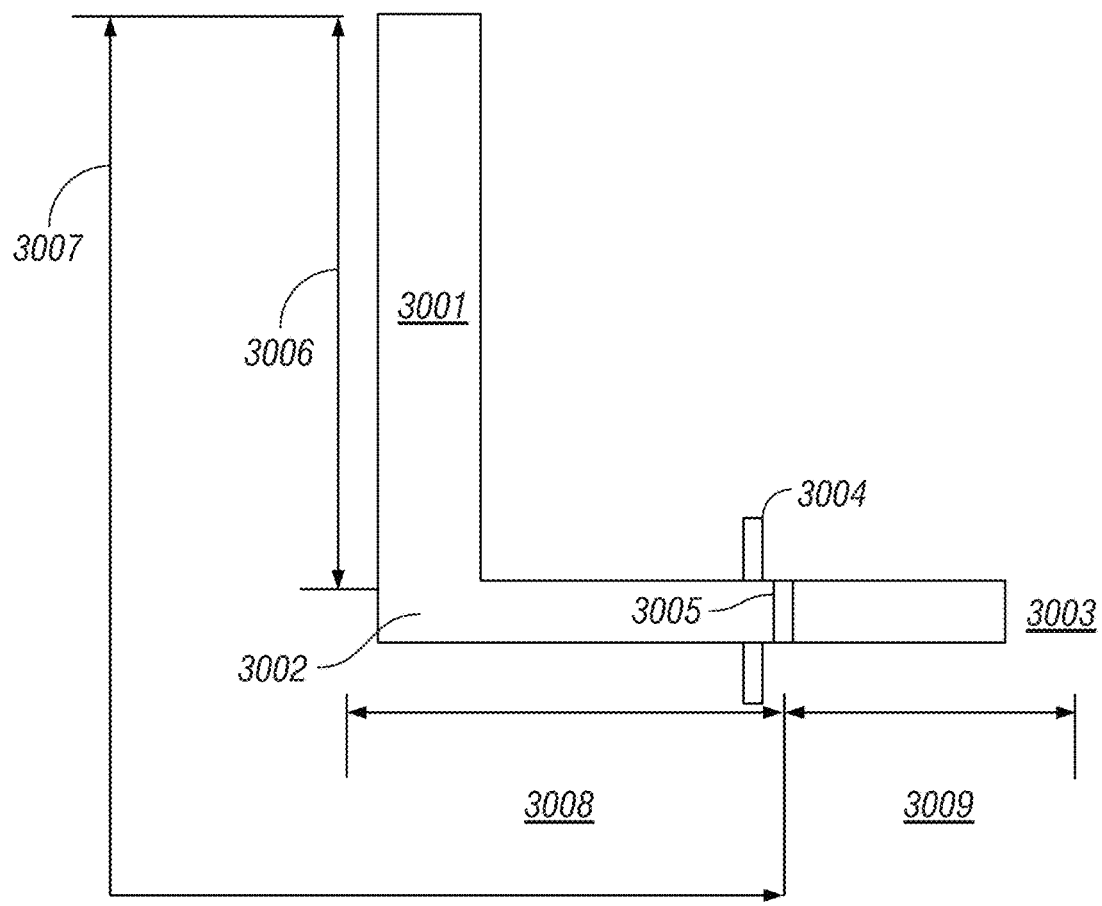
FIG. 30 shows a diagram of a borehole system and reflections referenced in FIG. 29. The borehole has an upper (surface, intermediate casing) region 3001, and a lower, production casing region 3002. Borehole bottom is 3003. A hydraulic fracturing treatment is responsible for perforations and a fracture network depicted by a gray rectangle 3004. A plug is shown as 3005. The relevant reflections between points of interest are shown at 3006—between the surface and the casing joint, 3007—between the surface and plug/fracture region, 3008—between the plug and the casing joint, and 3009—between the plug and the bottom of the borehole.

FIG. 29 shows autocorrelation of reflections from several time periods across all fracture treatment stages. The designations in the key are explained in FIG. 30. The correlated trend labeled 2902, corresponds to a reflection between a plug and the bottom of the borehole. The amplitude of this reflection can provide information in real-time about the quality of the plug set (how much energy is leaking past the plug) for each stage.

The energy spectrum and reflection arrival time are examined across all hydraulic fracturing treatment stages. These results are shown in FIGS. 28 and 29. FIG. 28 shows changes in the power spectrum and time of acoustic reflection arrivals with respect to fracture treatment stage, while FIG. 29 identifies some known reflections in the autocorrelations of multiple pressure waves across all stages.

The intermediate casing reflection arrival time remains approximately constant between stages, indicating that conditions in the upper section of the borehole do not vary significantly. Changes in this arrival time would appear in the event of a screenout, casing failure, or other significant change in the section of the borehole extending to the intermediate casing.

Energy distribution between modes; as shown in the top power spectrum plot; should vary with respect to borehole condition and the influence of the induced fracture network on the overall resonance of a particular mode.

11. Fluid viscosity changes from Conductivity

Figure 31:
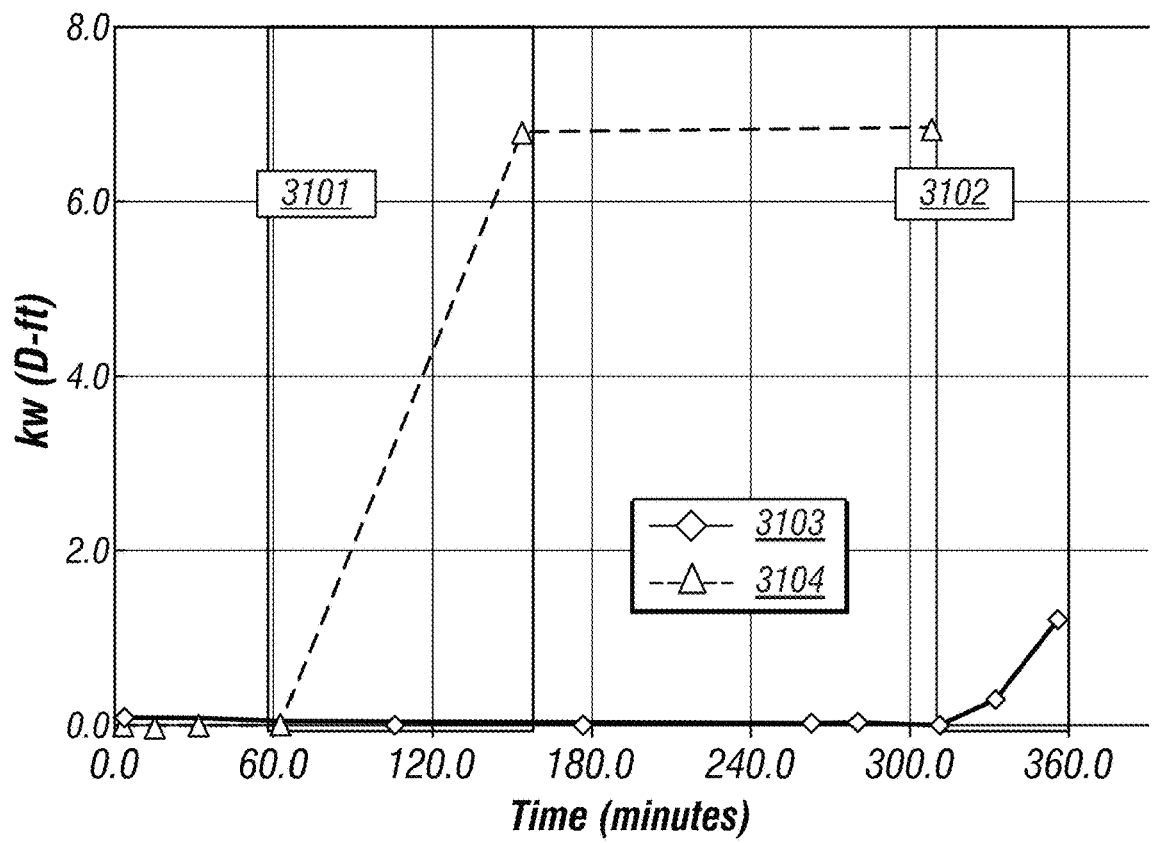
FIG. 31 shows measured conductivity as a function of time after shut-in for 2 stages, 3103, and 3104. It can be observed, that conductivity rapidly increases in both cases, indicating a decrease in fluid viscosity, i.e. gel breakdown at approximately 120 minutes for stage 3104 and 330 minutes for stage 3103. The gel breakdown occurs in the region 3101 for stage 3104, and in the region 3102 for stage 3102. A different behavior of gel in each stage can thus be concluded.

FIG. 31 depicts several hours of measurements taken after a fracturing operation using a hybrid gel was completed for two representative fracture treatment stages. A substantial increase in conductivity may be observed in both cases as time after the end of fracture treatment progresses. This increase is due to breakdown of gel used in each fracture treatment stage. In the case of stage 3102, gel breakdown occurs at 5 to 5.5 hours after shut-in. After stage 3101, gel breakdown begins sometime between 1 to 2.5 hours after shut-in. Possible explanations for the difference in timing of the gel breakdown include different chemistries applied to the various treatments and/or overall volume of fluid pumped (stage 3102 has three times the fluid volume of stage 3101).

Figure 36:
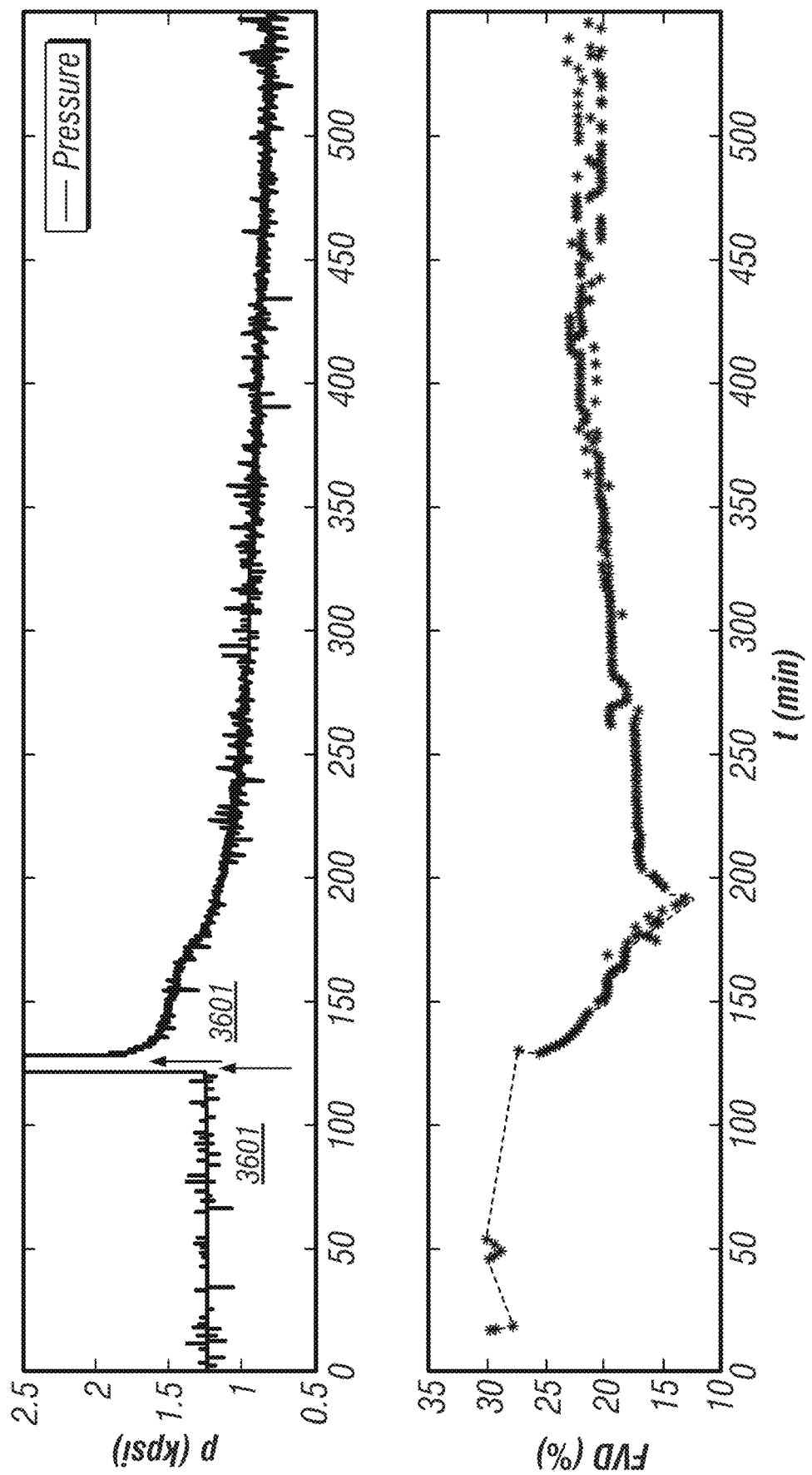
FIG. 36 shows a longer term measurement of FVD (in %) on the bottom graph from active pulses, represented by a dot each. The treatment time is not accounted for, but the treatment happens between the two arrows, 3601. A sharper decrease in FVD % (fracture closure) followed by a slower rise (gel breakdown) and an eventual plateau are apparent.
Figure 37:
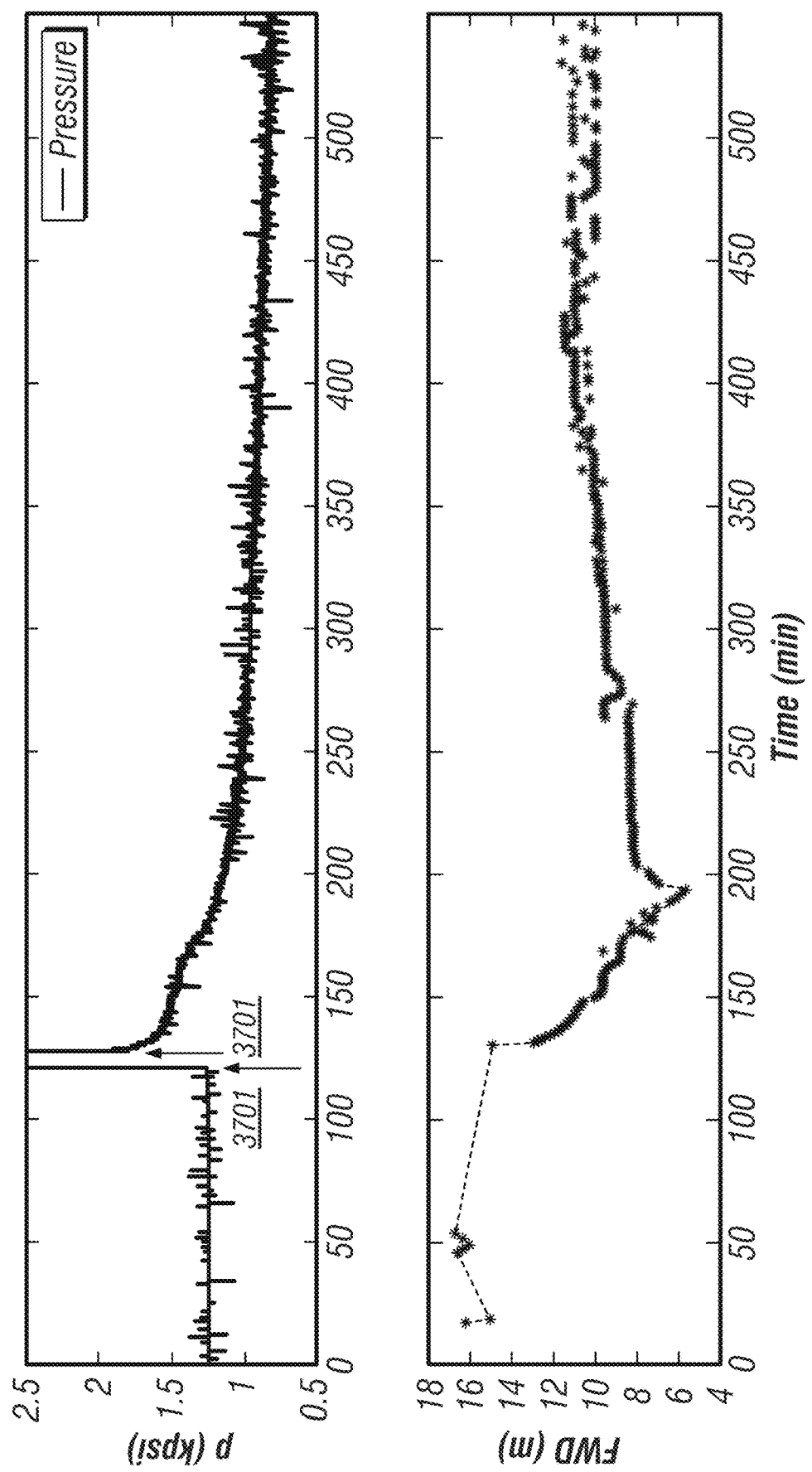
FIG. 37 shows a longer term measurement of FVD (in m) on the same dataset as FIG. 36. The treatment time is not accounted for, but the treatment happens between the two arrows, 3701. Same trends as in FIG. 36 are shown.

FIGS. 36 and 37 bottom shows similar identification of a significant viscosity change based on techniques of FVD/FWD described in Sections 2, 3 earlier.

12. Perforating Gun Signal Analysis

Figure 32:
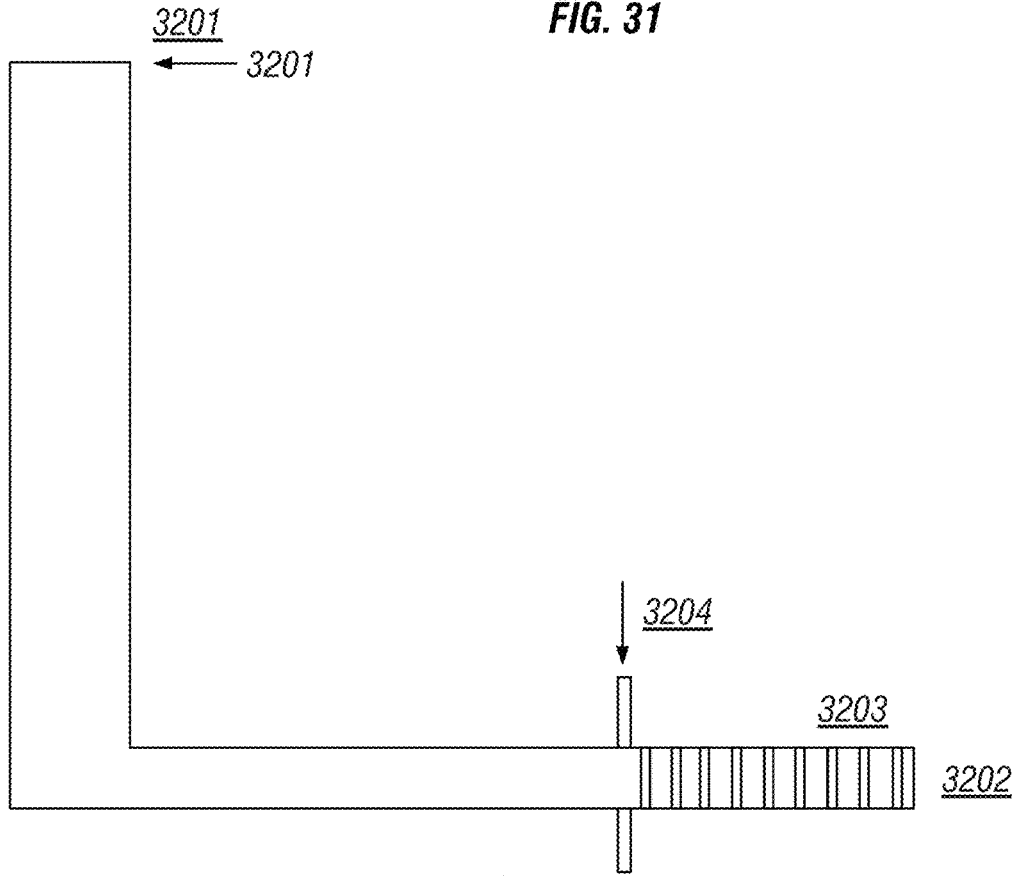
FIG. 32 shows a diagram of a borehole and location where perforations would take place. Surface is at 3201, and that is where active controlled pulses would normally be initiated. Borehole bottom is 3202. 3203 shows a series of plugs already placed for stages that have been completed. 3204 shows the location where perf shots for the current stage would take place.
Figure 33:
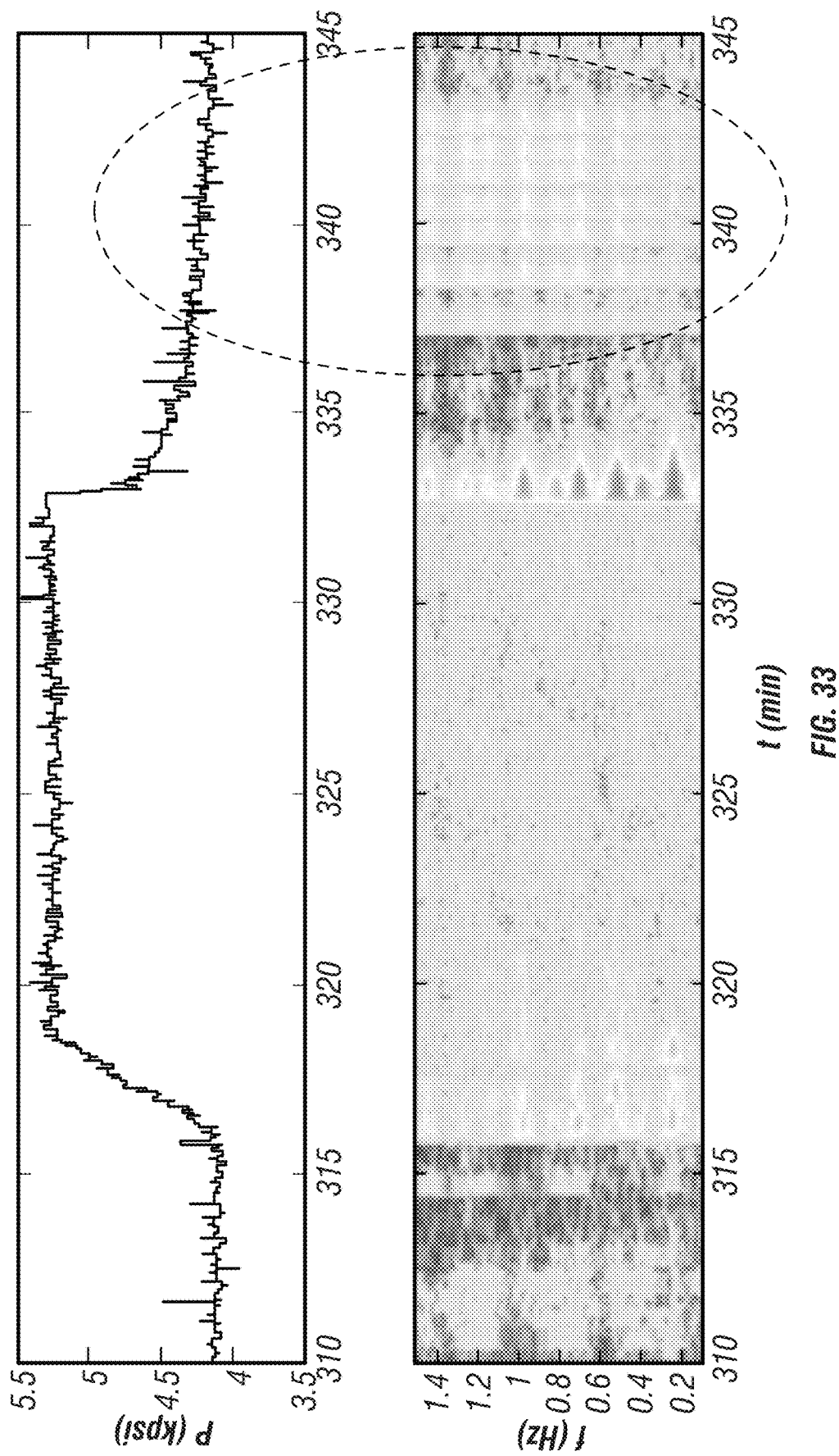
FIG. 33 shows a spectrogram of a process of pumping down a wireline (minute 315-332) through the horizontal portion of the borehole, followed by perforations (circled). Perforations take place near the plug and the fractured region, as shown in FIG. 32. Note the strong resonances at the pump shutdown a small water hammer (~minute 332).
Figure 34:
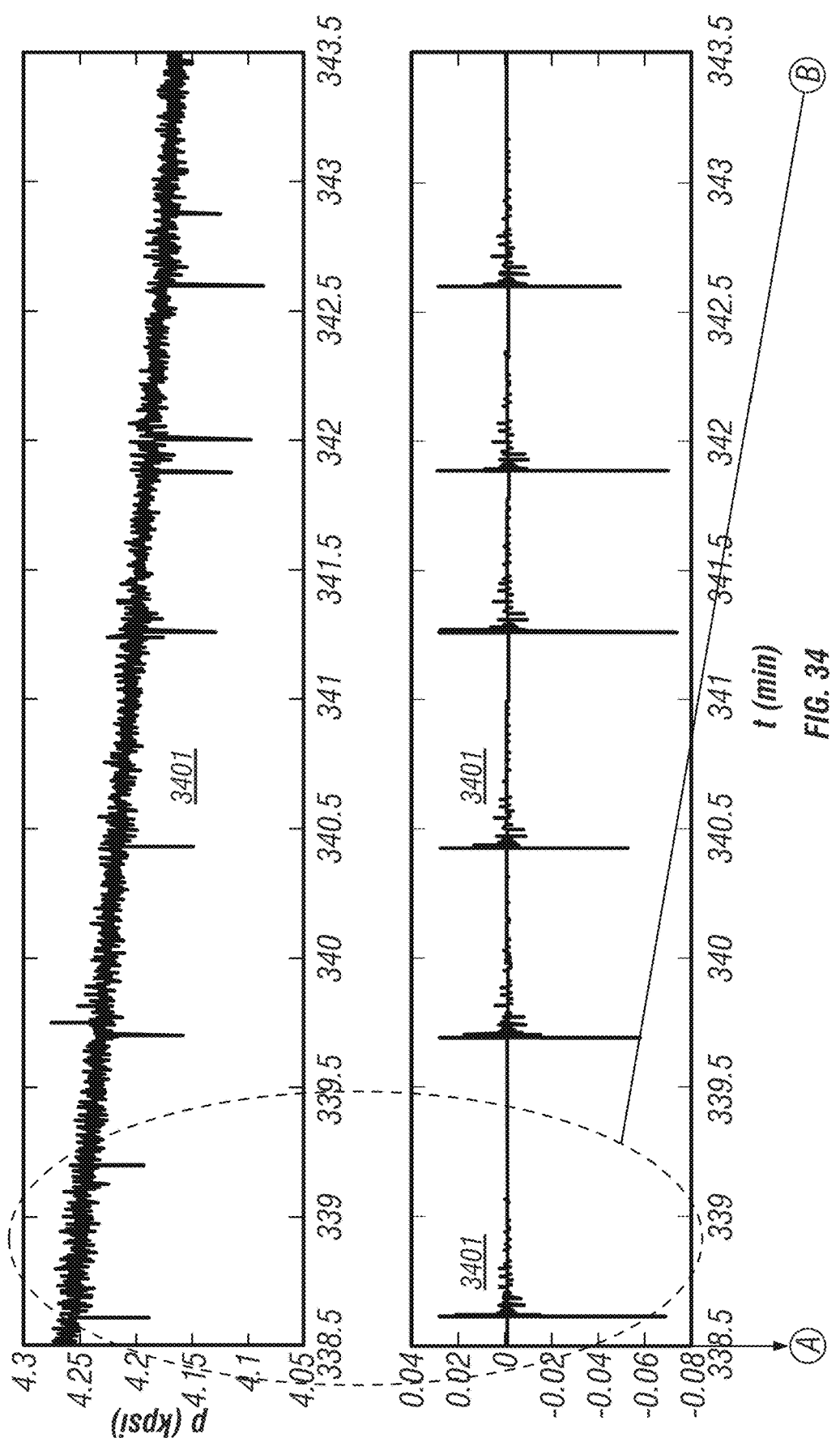
FIG. 34 shows 6 perforation pulses, 3401, seen in pressure and hydrophone signal in the top 2 graphs. Circled region of a single pulse is zoomed in the bottom 2 graphs. Higher frequencies present in the perforation pulse offer a higher spatial resolution.
Figure 34:
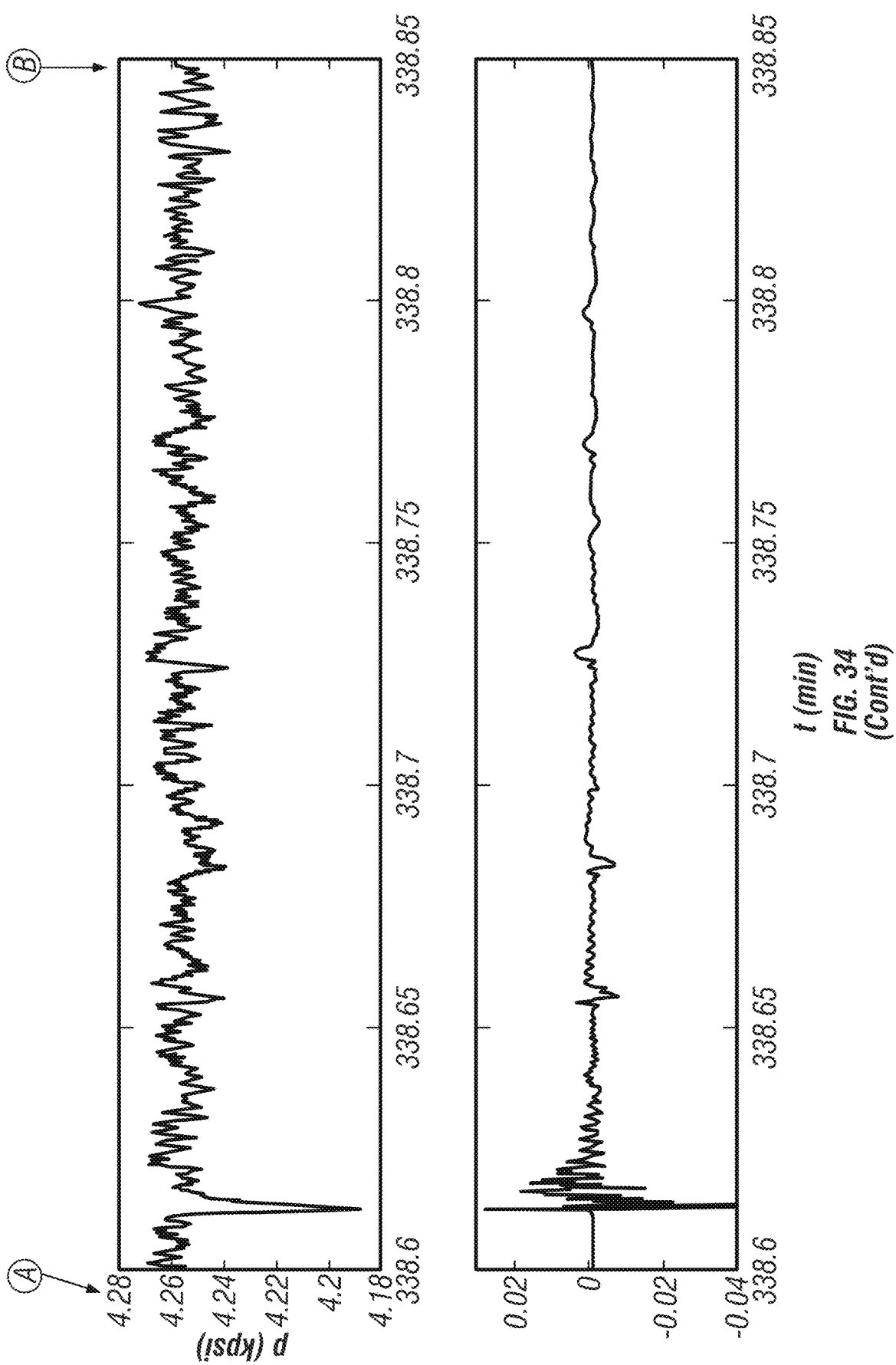

Additional analysis of the borehole bottom condition can be performed by analyzing the perforation shots or plug-setting signals as depicted in FIG. 32 and FIGS. 33, 34 and take progressively closer observations of the data. Comparing the data stage to stage may provide indication of perforation quality and perforations within a single stage. If a borehole connection to significant fractured volume(s) appears, the perforation signals reflected to wellhead-deployed sensors will appear more attenuated.

13. Fracture Closure Over Time

Figure 35:
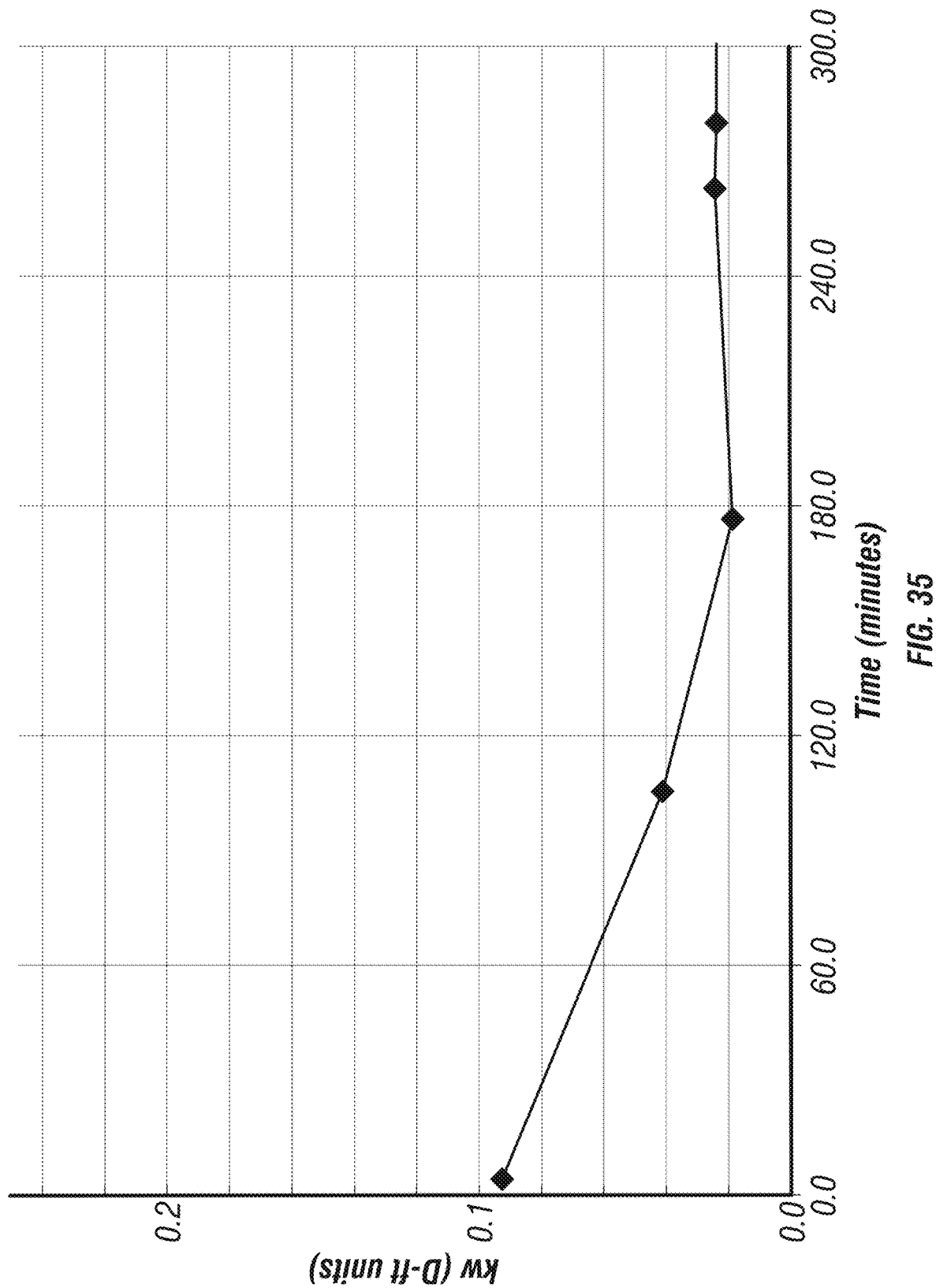
FIG. 35 shows a fracture conductivity change over time of 100 s demonstrating slow fracture closure.

Note that measurements of conductivity using an active source waveform (to calculate conductivity as in Section 7. above) can be performed at various frequencies and various times after the fracturing operations ends (after fracture treatment pump shut-in) to arrive at a time series evolution of the fracture conductivity (i.e. fracture closure rate). Fracture conductivity as shown in FIG. 35 illustrates how fractures initially tend to close and then somewhat stabilize over approximately 3 hours past completion of the fracturing treatment. Similar analysis can be performed using FVD/FWD methods (described above) as shown in FIGS. 36, 37.

14. Gel/Fluid Presence in the Borehole

Figure 38A:
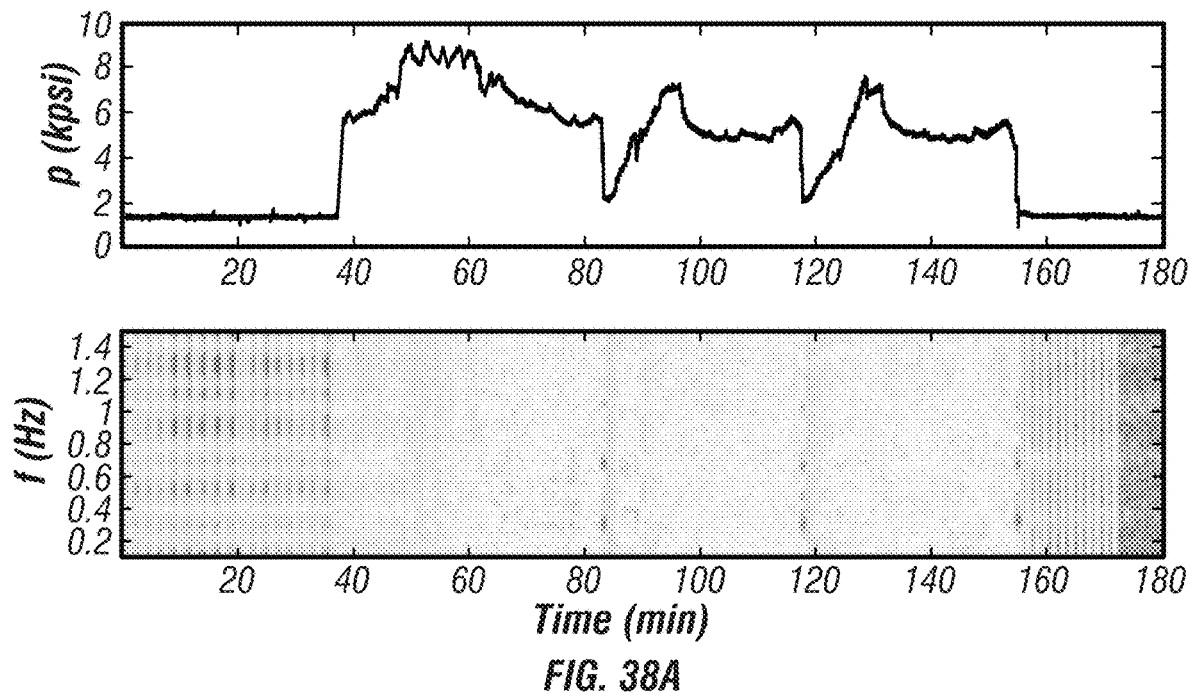
FIGS. 38*a* and 38*b* show, respectively, a poor apparent resonances in FIG. 38*a*, compared to a good, or more apparent resonances in a stage represented by a pressure and spectrogram shown in FIG. 38*b*. Presence of gel, or higher viscosity fluid/obstacles in the borehole in FIG. 38*a* show poorer (lower quality, Q, broader resonant peaks) when compared with what is shown in FIG. 38*b*.
Figure 38B:
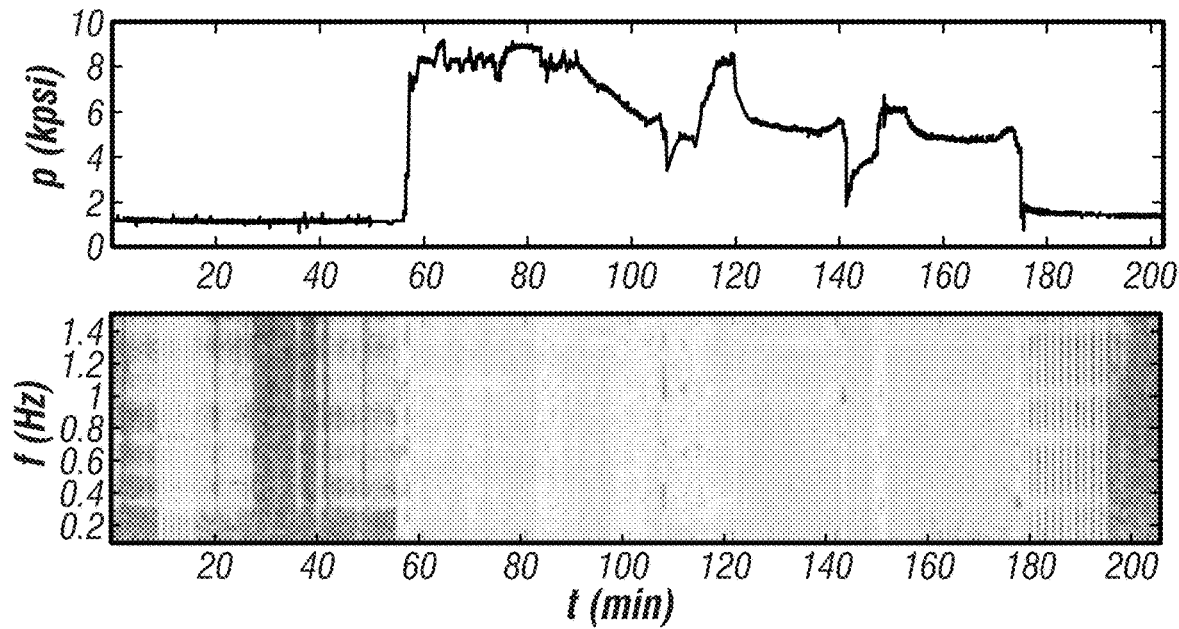

Simple analysis of resonant structures identifies when obstacles and dissipating/scattering elements or features are present in the borehole. In the particular case presented here as shown in FIG. 38, a lack of resonances on 38a indicates a presence of a gel in the lower portion of the borehole due to incomplete and imperfect flush Conversely, good resonances in 38b show a good flush and no/limited presence of obstacles and gel in the borehole. Pressure with respect to time is shown in the portion of each graphs in FIG. 38a,b and frequency with respect to time is shown in the lower portions of FIG. 38a,b.

Although only a few examples have been described in detail above, those skilled in the art will readily appreciate that many modifications are possible in the examples. Accordingly, all such modifications are intended to be included within the scope of this disclosure as defined in the following claims.

REFERENCES CITED IN THIS DISCLOSURE

White, J. E. (1983) *Underground Sound: Application of Seismic Waves.* Elsevier, Upchurch, E. R. (2003), *Determining Fracture Closure Pressure in Soft Formations Using Post-Closure Pulse Testing*, SPE Prod. Facil., 18(04), 230-235, doi:10.2118/87087-PA.

Wright, C. A., L. Weijers, W. A. Minner, and D. M. Snow (1996), *Robust Technique for Real-Time Closure Stress Determination*, SPE Prod. Facil., 11(03), 150-155, doi: 10.2118/30503-PA.

J. E. White, 1983, *Underground Sound: Application of Seismic Waves*, Volume 18 of Methods in geochemistry and geophysics, Elsevier, 1983 (ISBN 0444416900, 9780444416902).

What is claimed is:

1. A method for characterizing fractures and hydraulic fracturing treatment in a subsurface formation, comprising:
    pumping a hydraulic fracturing treatment into the subsurface formation through a wellbore;
    inducing seismic energy in the wellbore;
    measuring at least one of pressure and time derivative of pressure in the wellbore while fracturing treatment is ongoing;
    detecting and analyzing the seismic energy induced in the wellbore, in a form of a frequency spectrum of tube waves reflected from the subsurface formation; and
    using detected resonances in the reflected tube waves and change of the detected resonances over time to characterize at least one of, (i) a wellbore condition, (ii) a property of the hydraulic fracturing treatment, (iii) at least one fracture in the subsurface formation or (iv) a fracture network in the subsurface formation.

2. The method of claim 1, wherein a fracture extent and growth thereof are determined by analyzing energy frequency spectra in the detected seismic energy.

3. The method of claim 1, wherein changes in at least one dominant frequency in the detected resonances are identified to indicate possible operational difficulty.

4. The method of claim 1, wherein fracture treatment proppant placement and/or fracture proppant conductivity distribution is determined by analyzing acoustic energy frequency spectra with respect to proppant penetration depth.

5. The method of claim 1, wherein the frequency spectrum in the detected resonances is substituted by an autocorrelation spectrum to improve signal to noise ratio.

6. The method of claim 1, wherein a fracture tortuosity and/or a near-borehole fracture complexity is determined by structure and behavior of resonant structures during fracture treatment pumping.

7. The method of claim 1, wherein the characterized wellbore condition takes account of dampening of resonant modes caused by a presence of fluids having a particular viscosity.

8. The method of claim 1, wherein a resonance quality factor (Q) of the borehole is used to estimate the wellbore condition.

9. The method of claim 1, wherein determining changes in resonant mode frequency of the detected resonances with respect to time is related to physical parameters of at least one of the at least one fracture in the formation or the wellbore condition.

10. The method of claim 1 wherein the seismic energy is induced in the wellbore by actuating a seismic energy source in fluid communication with the well.

11. The method of claim 1 wherein the seismic energy is induced in the wellbore by generating water hammer.

12. The method of claim 1 wherein the seismic energy is induced in the wellbore by fracturing occurring in the subsurface formation.

\* \* \* \* \*